(12) United States Patent
Kurita et al.

(10) Patent No.: US 7,188,351 B2
(45) Date of Patent: Mar. 6, 2007

(54) DISC CARTRIDGE

(75) Inventors: Kazuhito Kurita, Kanagawa (JP); Mikinori Matsuda, Kanagawa (JP); Takahiro Yamada, Saitama (JP); Toru Morikawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/545,403

(22) PCT Filed: Dec. 20, 2004

(86) PCT No.: PCT/JP2004/019008

§ 371 (c)(1),
(2), (4) Date: Aug. 12, 2005

(87) PCT Pub. No.: WO2005/066957

PCT Pub. Date: Jul. 21, 2005

(65) Prior Publication Data

US 2006/0080698 A1    Apr. 13, 2006

(30) Foreign Application Priority Data

Jan. 8, 2004    (JP) .............................. 2004-003445

(51) Int. Cl.
*G11B 23/03* (2006.01)
(52) U.S. Cl. ...................................... 720/738
(58) Field of Classification Search ................. 720/738
See application file for complete search history.

(56) References Cited

FOREIGN PATENT DOCUMENTS

| JP | 7-272427 | 10/1995 |
| JP | 2000-48516 | 2/2000 |
| JP | 2002-56601 | 2/2002 |

OTHER PUBLICATIONS

U.S. Appl. No. 11/107,804, filed Apr. 18, 2005, Matsuda et al.
U.S. Appl. No. 11/108,669, filed Apr. 19, 2005, Morikawa et al.
U.S. Appl. No. 11/110,809, filed Apr. 21, 2005, Yamada et al.
U.S. Appl. No. 11/113,110, filed Apr. 25, 2005, Matsuda et al.
U.S. Appl. No. 10/541,456, filed Jul. 6, 2005, Ohgi et al.
U.S. Appl. No. 10/545,403, filed Aug. 12, 2005, Kurita et al.

*Primary Examiner*—Hoa T. Nguyen
*Assistant Examiner*—Mark Blouin
(74) *Attorney, Agent, or Firm*—Oblon, Spivak, McClelland, Maier & Neustadt, P.C.

(57) ABSTRACT

A disc cartridge includes a cartridge body unit having an optical disc (2) rotatably housed in it and provided with a recording and/or reproducing aperture (13) for exposing a part of the disc to outside, and a shutter member (15) slidably carried by the cartridge body member (5). A shutter opening/closing member (63) provided to a disc drive device (50) slides on the shutter member. The shutter member also includes an engagement opening (17a) engaged by the shutter opening/closing member. The shutter member operates for opening/closing the recording and/or reproducing aperture. The shutter member includes a collision buffering part (20) for absorbing the shock of collision against the shutter opening/closing member.

19 Claims, 16 Drawing Sheets

DISC CARTRIDGE

TECHNICAL FIELD

This invention relates to a disc cartridge having housed therein a disc, such as an optical disc, used as an information recording medium.

This application claims priority of Japanese Patent Application No. 2004-003445, filed in Japan on Jan. 8, 2004, the entirety of which is incorporated by reference herein.

BACKGROUND ART

Up to now, a disc cartridge, which has rotationally housed therein a disc, such as an optical disc, used as an information recording medium, and which is loaded on a recording and/or reproducing apparatus as the disc is housed therein, has been put to extensive use. This sort of the disc cartridge protects the disc-shaped recording medium by housing it in a cartridge body member, while enabling facilitated insertion/detachment of the disc for a recording and/or reproducing apparatus.

Since the disc cartridge is designed to enable the disc to be loaded on the recording and/or reproducing apparatus, as the disc remains housed in the cartridge body member, there is formed in the cartridge body member a recording and/or reproducing aperture for exposing a part of the disc to outside across the inner and outer rims of the disc. A head part for recording and/or reproduction, such as an optical pickup, mounted to the recording and/or reproducing apparatus, faces the disc via this recording and/or reproducing aperture, and scans the signal recording area of the disc to record and/or reproduce the information signals.

Thus, the disc cartridge, having the disc housed therein, is provided with a shutter member for closing the recording and/or reproducing aperture. This shutter member includes a rectangular flat-plate shaped shutter part, having the dimension sufficient to close the recording and/or reproducing aperture, and a support part 101 of a U-shaped cross-section, formed towards the proximal end of the shutter part. The shutter member has its support part introduced into a groove-shaped slide guide formed in the cartridge body unit, and hence the shutter member is slidable along a lateral surface of the cartridge body unit. In this manner, the shutter member may be slid so that its shutter part may open/close the recording and/or reproducing aperture.

The shutter member includes, in a side of the support part thereof facing a lateral side of the cartridge body unit, a shutter opening/closing opening into which is inserted a shutter opening/closing member 100 adapted for opening/closing the shutter member. This shutter opening/closing member, introduced into the shutter opening/closing opening, is provided to a main apparatus body unit of the disc recording and/or reproducing apparatus, and is formed by, for example, an elastic spring, exhibiting the flexibility. Referring to FIG. 20, the shutter opening/closing member 100 includes a substantially chevron-shaped retention part 102 protruded on the movement trajectory of the shutter member for holding the so intruded disc cartridge in order to watch the intrusion of the disc cartridge. As the cartridge body unit is transported, this retention part 102 is abutted against the foremost part of the support part 101 of the shutter member to flex the shutter opening/closing member 100. Thus, the shutter opening/closing member rides on the support part 101 to be slid thereon for intrusion into and engagement with the shutter opening/closing opening.

In this manner, the shutter opening/closing opening is regulated in the movement thereof along the slide guide part provided to the cartridge body unit to inhibit intrusion of the shutter member into the main apparatus body unit. Hence, the shutter member is moved relative to the cartridge body unit of the disc cartridge transported further into the main apparatus body unit, thereby opening the recording and/or reproducing aperture. When the disc cartridge is moved in the direction of being ejected from the disc recording and/or reproducing apparatus, the shutter member, engaged by the shutter opening/closing member 100 and thereby prohibited from being moved further, is moved relative to the cartridge body unit of the disc cartridge being transported to outside the main apparatus body unit, such as to close the recording and/or reproducing opening. When the cartridge body unit is ejected to outside the recording and/or reproducing apparatus, the shutter opening/closing member 100 is flexed to outside the cartridge body unit, due to the sliding of the shutter opening/closing opening, and hence the retention part is receded from the shutter opening/closing opening.

With the above-described state-of-the art disc cartridge, the foremost part of the support part 101 of the shutter member, which is the contact point of the shutter opening/closing member 100 with the shutter member, is square-shaped, with the consequence that the retention part 102 is abutted against the distal end of the support part 101 to interfere with smooth insertion and worsen the sense of insertion of the disc cartridge. In addition, the retention part 102 of the shutter opening/closing member 100 and the support part 101 of the shutter member, colliding against each other, tend to deteriorate or cause wear of the two components, while dust and dirt also tend to be produced.

DISCLOSURE OF THE INVENTION

Problem to be Solved by the Invention

It is therefore an object of the present invention to provide a novel disc cartridge whereby the aforementioned problems of the conventional disc cartridge may be resolved.

It is another object of the present invention to provide a novel disc cartridge whereby the sense of insertion operation thereof into the disc recording and/or reproducing apparatus may be improved.

It is yet another object of the present invention to provide a novel disc cartridge whereby it is possible to protect the shutter member adapted for opening/closing the recording and/or reproducing aperture.

The disc cartridge according to the present invention includes a disc, a cartridge body unit having the disc rotatably housed therein and including a recording and/or reproducing aperture for exposing a part of the disc to outside, and a shutter member slidably carried by the cartridge body unit, The shutter member includes a shutter opening/closing member provided to a recording and/or reproducing apparatus for sliding on the shutter member. The shutter member also includes an engagement opening engaged by the shutter opening/closing member. The shutter member operates for opening/closing the recording and/or reproducing aperture. The shutter member includes a collision buffering part for absorbing the shock of collision against the shutter opening/closing member.

When the disc cartridge according to the present invention is inserted into the recording and/or reproducing apparatus, the shutter opening/closing member, provided to the recording and/or reproducing apparatus, is abutted against the collision buffering part and, by being guided by this collision buffering part, smoothly rides on the shutter member so as to be slid thereon. Consequently, there is no catch between the end of the shutter member and the shutter opening/closing member of the recording and/or reproducing apparatus, thereby improving the sense of an inserting operation into the recording and/or reproducing apparatus and also protecting the shutter member and the shutter opening/closing member.

Other objects and specified advantages of the present invention will become more apparent from the following explanation of the preferred embodiments thereof especially when read in conjunction with the drawings.

BEST MODE FOR CARRYING OUT THE INVENTION

Figure 1:
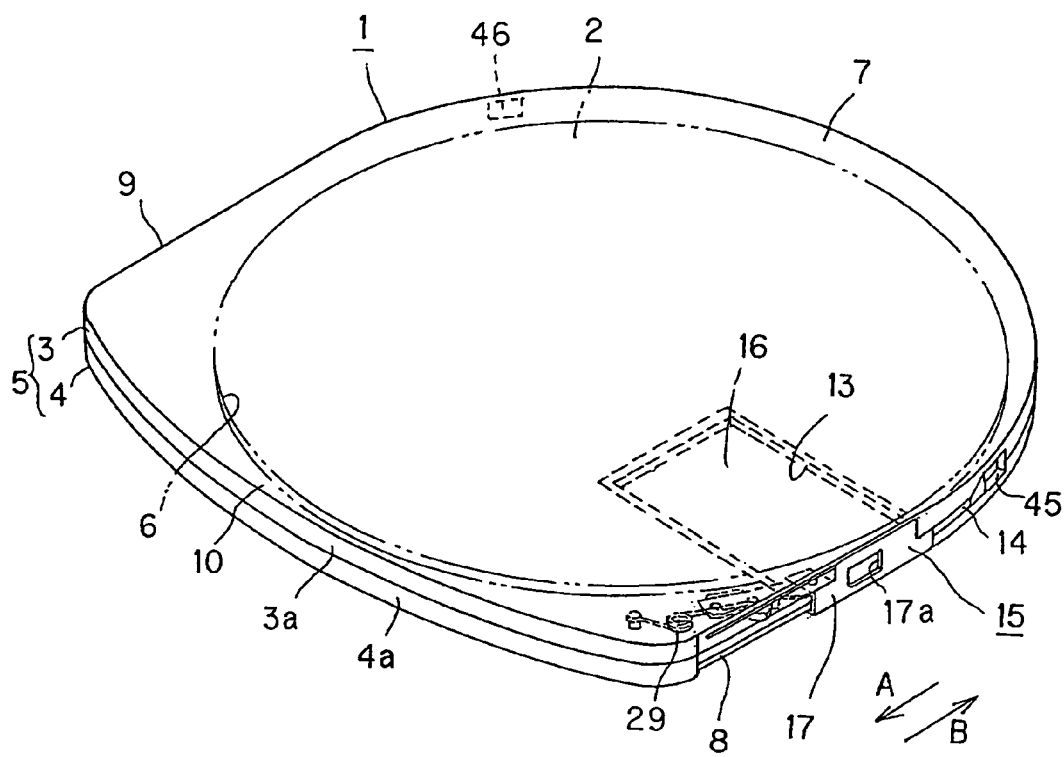
FIG. 1 is a perspective view of the disc cartridge of the present invention, looking from the upper cartridge half side.

Referring to the drawings, preferred embodiments of the present invention are explained in detail.

Figure 2:
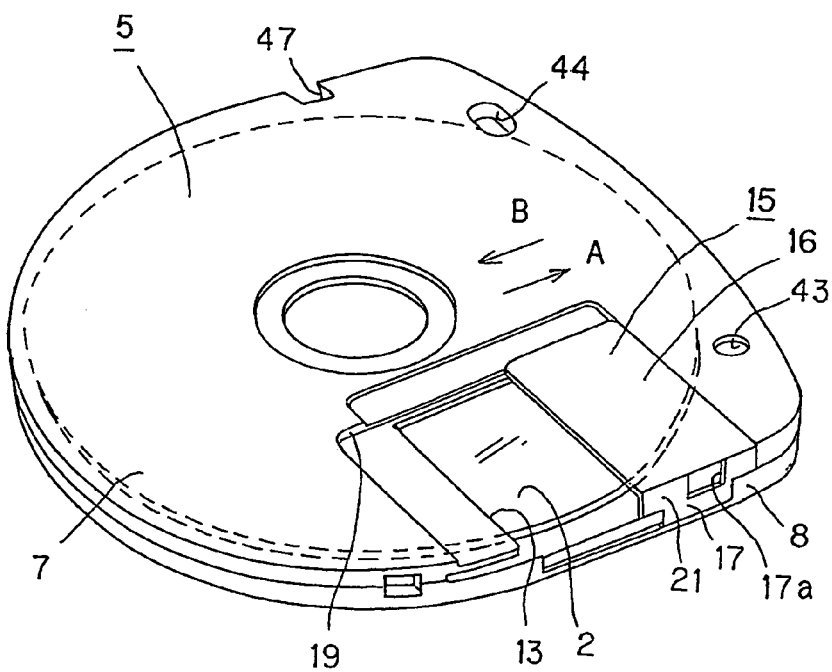
FIG. 2 is a perspective view of the disc cartridge of the present invention, looking from the lower cartridge half side.

A disc cartridge 1 of the present embodiment has rotationally housed therein an optical disc 2, as a disc used as an information recording medium. Referring to FIGS. 1 and 2, the disc cartridge 1 includes a cartridge body member 5, composed of paired upper and lower halves 3 and 4, abutted and connected together. The optical disc 2 is rotationally housed within this cartridge body member 5.

The disc cartridge 1 according to the present invention has housed therein the optical disc 2, carrying video data or program data for playing a television game, and is formed to an extremely small size. This disc cartridge 1 has housed therein a small-sized optical disc 2, with a diameter of approximately 60 mm, and is formed to a size that can be held in one's palm.

An upper cartridge half 3 and a lower cartridge half 4, forming the cartridge body member 5 for housing the optical disc 2, are formed by molding a synthetic resin material, and are abutted and connected to each other to form the cartridge body member 5. On the outer rims of the upper and lower cartridge halves 3, 4 are formed upstanding peripheral wall sections 3a, 4a, which are abutted to each other by abutting the upper and lower cartridge halves 3, 4 to each other to form a disc housing 6. Meanwhile, the upper and lower cartridge halves 3, 4 are coupled together by welding weld projections on the facing inner surfaces thereof by a welding technique, such as ultrasonic welding, to complete the cartridge body member 5.

Figure 3:
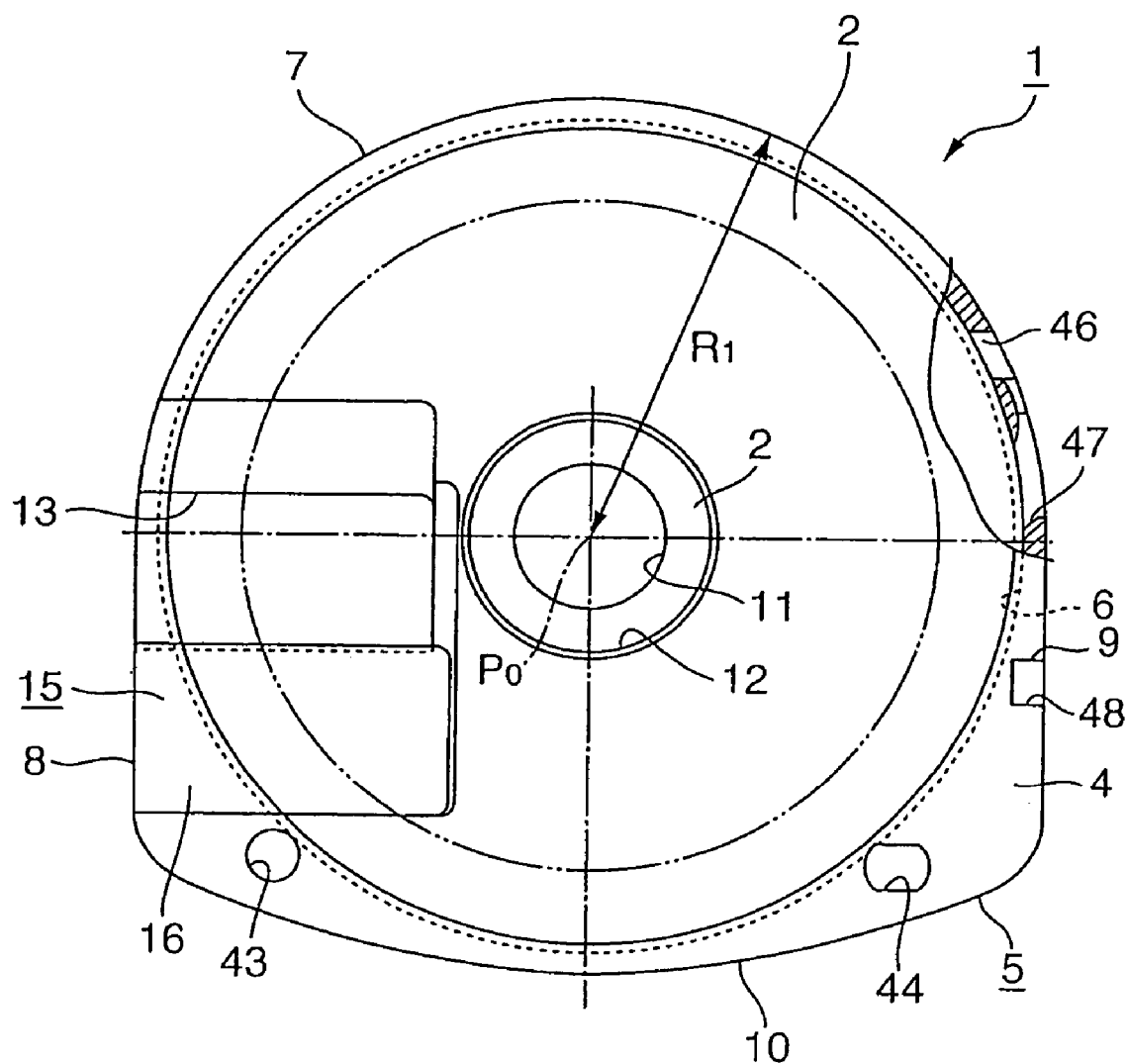
FIG. 3 is a plan view of the disc cartridge of the present invention, looking from the lower cartridge half side.

The cartridge body member 5, making up the disc cartridge 1, has a forward surface, as an inserting end side of the disc cartridge 1 into a disc drive device 50, in the form of an arcuate section 7, as shown in FIGS. 1 and 3. The arcuate section 7 is formed to a substantially semi-circular shape, with a constant radius R1, having the center of the optical disc 2, housed within the disc housing 6 of the cartridge body member 5, as a center PO, as shown in FIG. 2. That is, the arcuate section 7 is formed as a semi-circle facing a semi-circle of the optical disc 2 housed within the cartridge body member 5.

The facing lateral surfaces of the cartridge body member 5, continuing to the arcuate section 7 thereof, are formed as lateral sides parallel to each other, while the back surface thereof, lying on the opposite side of the arcuate section 7, is formed with a smoothly continuously curved section 10.

The disc cartridge 1 according to the present invention has its front side, as an inserting end side, as the substantially semi-circular arcuate section 7, more strongly curved than the remaining surfaces, so that, when the disc cartridge 1 is inserted or ejected by a slot-in system via a cartridge inserting/ejecting opening, formed in the disc drive device, the direction of insertion of the disc cartridge into the device can be discerned readily. In particular, with the disc cartridge 1 reduced in size so that it can be held in one's palm, the inserting direction can be discriminated with the feeling of the hand holding the disc cartridge 1. In addition, the present disc cartridge 1 can be inserted into the disc drive device of the slot-in type not only extremely readily but highly reliably, as will be explained later.

Moreover, with the disc cartridge 1, embodying the present invention, in which the inserting end side thereof is the substantially semi-circular arcuate section 7, with the back surface thereof, opposite to the arcuate section, being the curved section 10, the disc cartridge may further be reduced in size as compared to the optical disc 2 housed therein.

Centrally of the lower cartridge half 4, forming the lower surface of the cartridge body member 5, there is formed a circular center opening 12 for exposing to outside a center opening 11, formed in the center of the optical disc 2, housed in the cartridge body member 5, and a neighboring area thereof, as shown in FIGS. 2 and 3. Into the center opening 12 is intruded a part of the disc rotating driving mechanism, provided to the disc drive device, adapted for loading the disc cartridge 1 thereon, such as a turntable.

In the lower cartridge half 4, forming the lower surface side of the cartridge body member 5, there is formed an aperture for an optical head 13, as a recording and/or reproducing aperture, as shown in FIGS. 2 and 3. The aperture for an optical head 13 is formed in one lateral surface 8 of the cartridge body member 5 to a rectangular shape and to a size sufficient to permit part of the signal recording area of the optical disc 2 in the cartridge body member 5 to be exposed to outside across the inner and outer rims of the disc. That is, the aperture for an optical head 13 is formed in the lateral side 8 which is the rectilinear planar surface other than the forward surface of the cartridge body member 5 in which has been formed the arcuate section 7. This aperture for an optical head 13 is closed by a shutter member 15 which will be explained subsequently.

In the lateral surface 8 of the cartridge body member 5, in which is opened one longitudinal end of the aperture for an optical head 13, there is formed a guide groove 14, in which is guided a shutter opening member, as will be explained subsequently. When the disc cartridge 1 is introduced into the disc drive device, the shutter opening member, formed on the disc drive device, is intruded into the guide groove 14 to abut the shutter opening member against the shutter member 15 to open the aperture for an optical head 13.

The shutter member 15 for opening/closing the aperture for an optical head 13 is formed by punching and bending a thin metal sheet or on molding the synthetic resin material. The shutter member 15 includes a rectangular flat-plate-shaped shutter part 16, formed to a rectangular shape of a dimension large enough to close the aperture for an optical head 13, and a support piece 17 formed on the proximal end of the shutter part 16 to a U-shaped cross-section.

Figure 4:
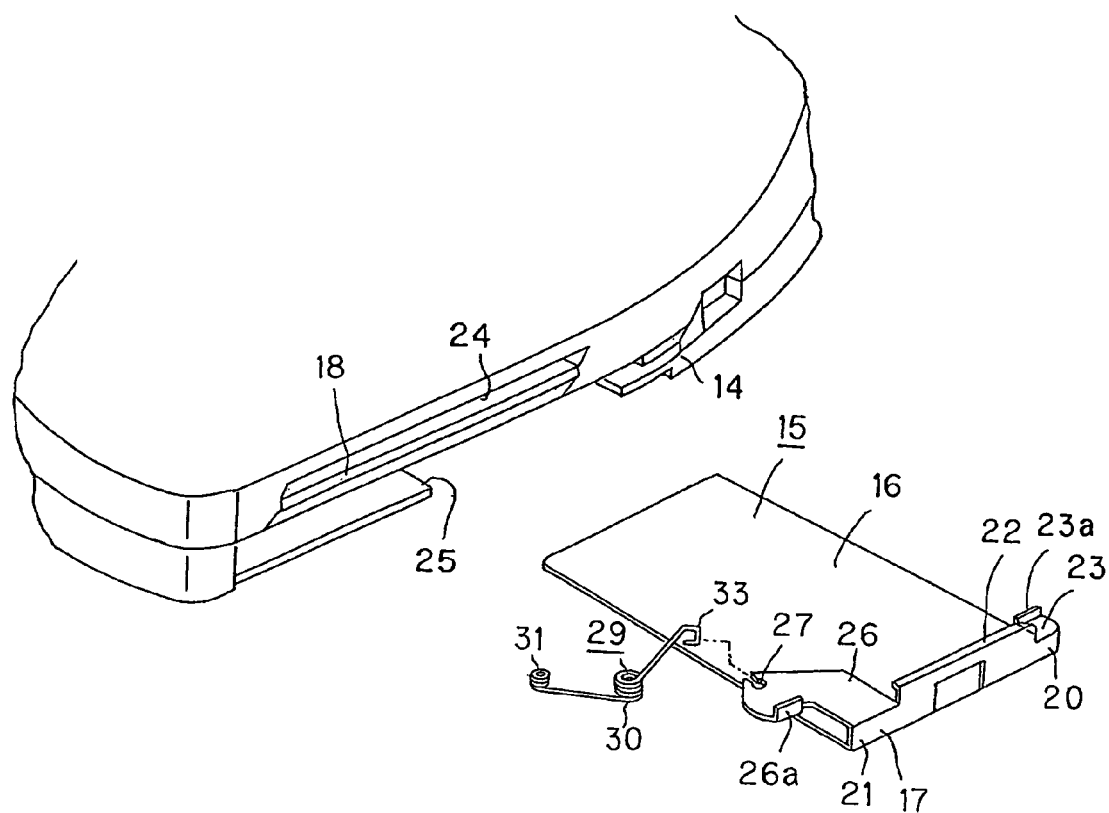
FIG. 4 is a perspective view showing the shutter member and the cartridge body unit carrying the shutter member.

The shutter member 15 supports the upper cartridge half 3 of the cartridge body member 5 by the support piece 17 so that the shutter member is carried for movement in the directions of arrows A and B in FIG. 2 for opening/closing the aperture for an optical head 13. That is, the shutter member 15 is mounted for movement to the cartridge body member 5, as the support piece 17 supports a slide guide part 18 formed by a fraction of the upstanding peripheral wall section 3a of the upper cartridge half 3, as shown in FIG. 4. The shutter member 15 is slid in a direction of opening or closing the aperture for an optical head 13, as the cartridge body member 5 is transported, by the support piece 17 engaging with a shutter opening/closing member 63 provided to the disc drive device 50.

Figure 5:
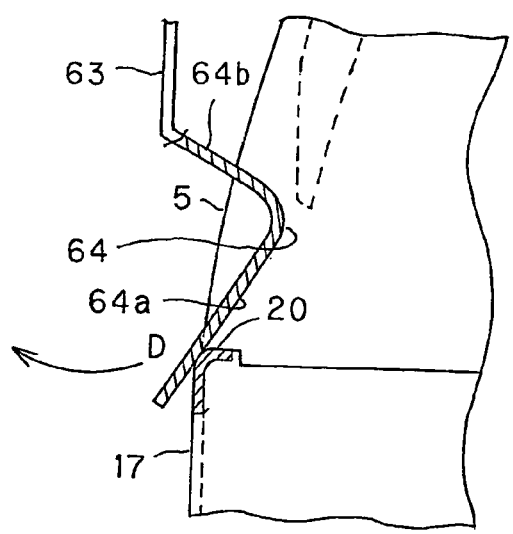
FIG. 5 is a plan view showing the manner the shutter opening/closing member is abutted against the buffering part of the shutter member.

The shutter opening/closing member 63, engaged by the shutter member 15, is now explained. The shutter opening/closing member 63 is engaged by the shutter member 15 to regulate the movement thereof to cause movement of the shutter member 15 relative to the cartridge body member 5 to close the aperture for an optical head 13. The shutter opening/closing member 63 is provided to a cartridge holder 54 of the disc drive device 50, as later explained, and is an elastic spring, exhibiting flexibility, as shown in FIG. 5. The shutter opening/closing member 63 is bent substantially to a chevron shape for protruding towards the cartridge body member 5, or is bent to form a chevron shaped cross-section, for defining an engagement part 64 adapted for engaging with the shutter member 15.

This engagement part 64 is made up by an inclined abutment surface 64a, and an inclined thrust surface 64b. The inclined abutment surface 64a is provided to the cartridge inserting/ejecting opening 53 formed in the disc drive device 50 and is abutted by the shutter member 15 of the disc cartridge 1 transported into the inside of a main body unit of an apparatus 51. The inclined thrust surface 64b is provided to a part of the disc drive device 50 opposite to the cartridge inserting/ejecting opening 53 and is thrust by the shutter member 15 of the disc cartridge 1 being ejected to outside the main body unit of the apparatus.

This shutter opening/closing member 63 watches the disc cartridge 1 being transported, as the engagement part 64 thereof is protruded at all times into the movement trajectory of the cartridge body member 5. When the disc cartridge 1 is inserted into the cartridge holder 54 of the disc drive device 50 and transported to the loading position, the engagement part 64 is intruded into the guide groove 14 formed in the lateral surface 8 of the cartridge body member 5, and is flexed in a direction indicated by arrow D in FIG. 5, by the inclined abutment surface 64a being abutted by the support piece 17 of the shutter member 15. The shutter opening/closing member 63 is engaged with the shutter member 15, by the engagement part 64 sliding on the support piece 17, and intruding into an engagement opening 17a, as later explained. When the disc cartridge 1 has been transported to outside the disc drive device 50, the inclined thrust surface 64b of the engagement part 64 is thrust by the engagement opening 17a, so that the shutter opening/closing member 63 becomes flexed in the direction indicated by arrow D in FIG. 5. The engagement part 64 is projected to outside the engagement opening 17a, so that the shutter opening/closing member 63 is disengaged from the shutter member 15.

Figure 6:
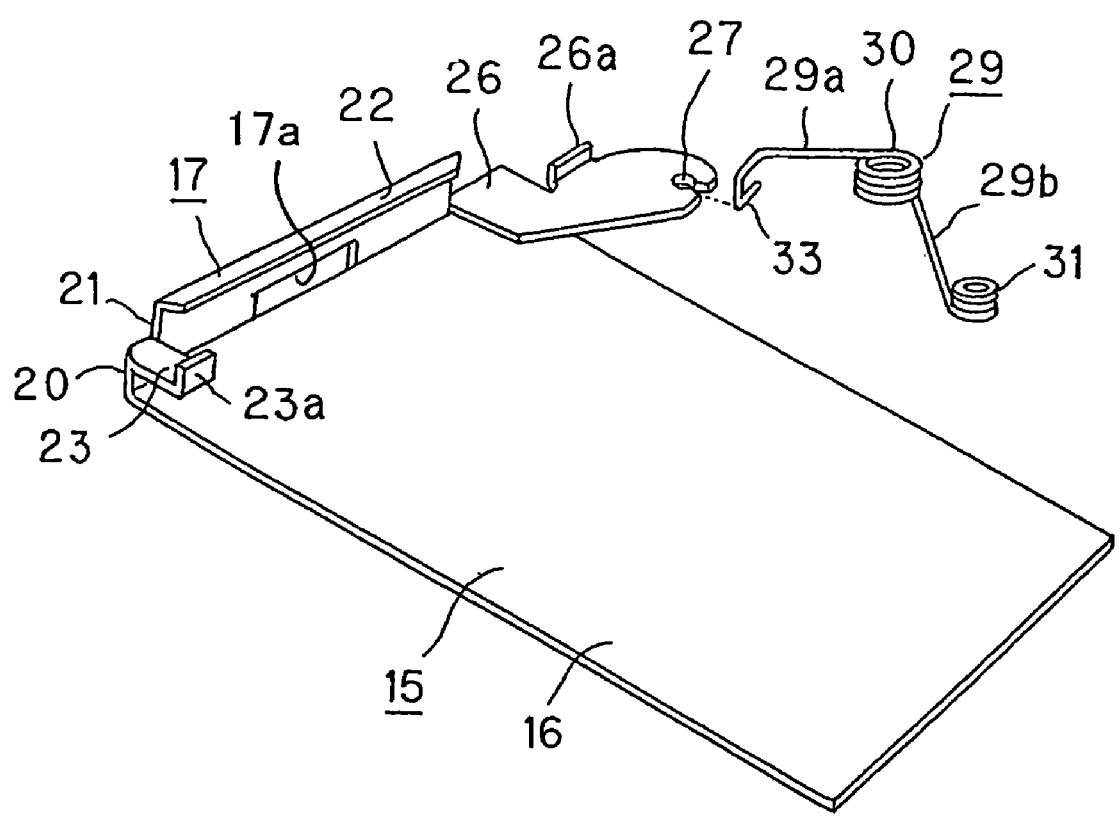
FIG. 6 is a perspective view showing the shutter member and a torsion coil spring mounted to this shutter member.

Referring to FIGS. 4 and 6, the support piece 17 of the shutter member 15, engaged by the shutter opening/closing member 63, is provided with a connecting part 21, formed as one with and upright from the proximal end of the shutter part 16, and a first engagement part 22 is formed by bending the foremost part of the connecting part 21 towards the shutter part 16. On the downstream side of the connecting part 21 along the direction of movement of the shutter member 15, there is formed a second engagement part 23 by bending the connecting part in the form of an upper case letter L at a lower level than the first engagement part 22. The foremost portion of the second engagement part 23 is bent in the form of an upper case letter L towards the first engagement part 22 to form a bent part 23a.

On the downstream side end of the support piece 17, along the direction of movement of the shutter member 15, there is formed a buffering part 20 for absorbing the shock produced on abutment on the support piece by the shutter opening/closing member 63 provided in the disc drive device 50. The buffering part 20 is moderately bent so as to be curved from the end part of the support piece 17 towards the distal end of the shutter part 16. Hence, in inserting the disc cartridge 1 into the disc drive device 50, the shutter opening/closing member 63, provided to the disc drive device, may be abutted against and guided by the moderately bent buffering part 20 so as to ride smoothly on the support piece 17. Consequently, the disc cartridge 1 may be inserted with a smooth sense of insertion into the disc drive device 50, with there being no catch due to collision between the end of the support piece 17 of the shutter member 15 and the shutter opening/closing member 63 of the disc drive device 50. In addition, deterioration or wear of colliding parts or generation of dust and dirt may be prohibited by absorbing the shock of collision between the shutter member 15 and the shutter opening/closing member 63.

In a mid portion of the support piece 17 along the sliding direction of the shutter member 15, there is formed an engagement opening 17a engaged by the shutter opening/closing member 63 at the time of insertion of the cartridge body member. The engagement opening 17a provides for engagement between the shutter member 15 and the shutter opening/closing member 63 by being engaged by the shutter opening/closing member 63 which is slid along the support piece 17 as it is guided by the buffering part 20. By the shutter member 15 engaging with the shutter opening/closing member 63, the movement of the shutter member 15 is regulated, such that the shutter member 15 is moved relative to the cartridge body member 5 in a direction of closing the aperture for an optical head 13.

Upstream of the movement direction of the shutter member 15, the connecting part 21 is provided with a coil spring mounting piece 26 having a retention opening 27 for engaging with and retaining a torsion coil spring 29 as later explained. Similarly to the second engagement part 23, the coil spring mounting piece 26 is formed with a bent part 26a having the form of an upper case letter L, with the foremost part thereof protruding towards the first engagement part 22.

Into this retention opening 27 is inserted and retained, from an opening end thereof, a retention part 33, provided to a first arm section 29a of a torsion coil spring 29, as later explained, for interconnecting the shutter member 15 and the torsion coil spring 29.

Figure 7:
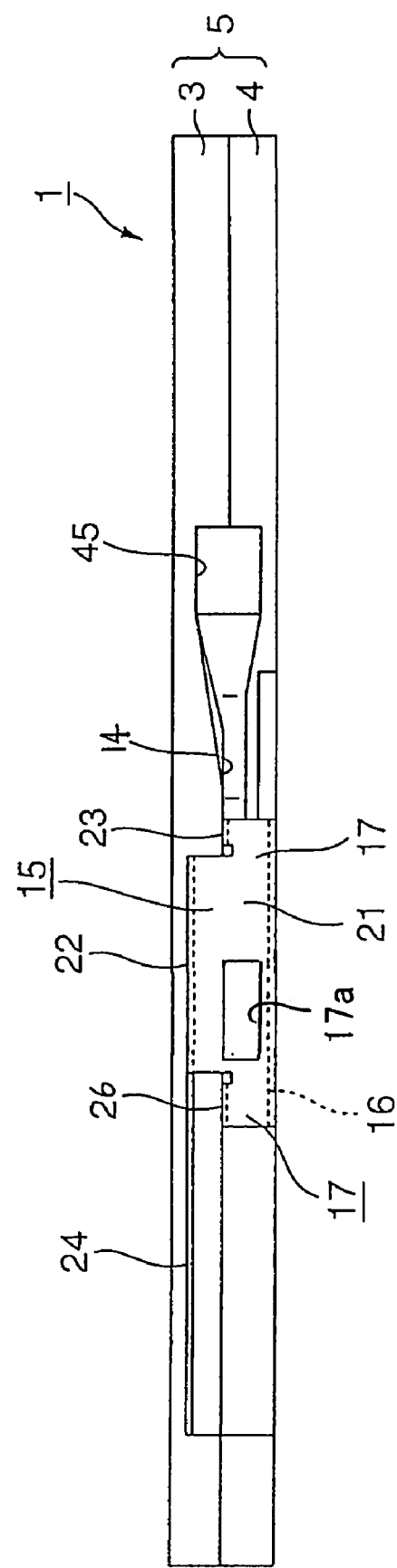
FIG. 7 is a side view showing the lateral side of the disc cartridge of the present invention carrying the shutter member.
Figure 8:
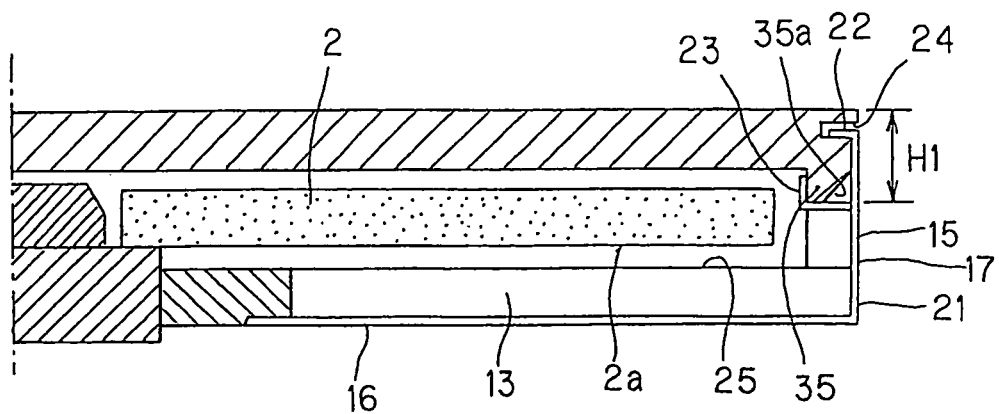
FIG. 8 is a cross-sectional view showing the state of mounting the shutter member to the cartridge body unit.

The shutter member 15 is mounted on the cartridge body member 5 with the shutter part 16 extending over the aperture for an optical head 13, as shown in FIG. 2. At this time, the support piece 17 of the shutter member 15 is held sandwiched at the first and second engagement parts 22, 23 and the coil spring mounting piece 26, with the first engagement part 22 provided to the support piece 17 engaging in an engagement groove 24 formed in the lateral surface of the slide guide part 18, and with the bent parts 23a, 26a, each in the form of upper case letter L, in the second engagement part 23 and in the coil spring mounting piece 26, respectively, engaging with the foremost parts of the slide guide part 18, respectively, as shown in FIGS. 6, 7 and 8. The shutter member 15, carried in this manner, is moved along the direction indicated by arrows A and B in FIG. 2, for opening/closing the aperture for an optical head 13, as the shutter member is guided by the support piece 17.

A recessed shutter slide part 19 is formed in an area of the lower cartridge half 4 through which is moved the shutter part 16. The shutter slide part 19 is formed to a depth such that the shutter part 16 is not protruded from the surface of the cartridge body member 5.

In a portion of the upstanding peripheral wall section 4a of the lower cartridge half 4 of the present embodiment of the disc cartridge 1, facing the aperture for an optical head 13, there is formed a cut-out 25, as shown in FIGS. 4 and 8. That is, the aperture for an optical head 13 is opened in an area extending across the inner and outer rims of the cartridge body member 5.

At least a portion of the slide guide part 18 in the upper cartridge half 3, facing the aperture for an optical head 13, is of a height H1, such that, when the optical disc 2 in the disc cartridge 1, loaded in position along the height-wise direction in a cartridge loading unit in the disc drive device 50, has been loaded in position on the turntable, the slide guide part is not protruded from a lower surface 2a of the optical disc 2 facing the lower cartridge half 4, as shown in FIG. 8.

With the disc cartridge 1, constructed as described above, when the shutter member 15 is moved to open the aperture for an optical head 13, the entire optical pickup, operating as a head for reading out information signals recorded on the optical disc 2, may be positioned within the cartridge body member 5. In addition, when the optical pickup has been moved to a position in which the optical pickup scans the outer rim of the optical disc, the objective lens, condensing the laser beam scanning the signal recording area of the optical disc 2, may be positioned within the cartridge body member 5, with the remaining optical block components being located outside the cartridge body member 5.

The result is that, with the disc cartridge according to the present invention, the optical pickup may be positioned across the inner and outer rims of the cartridge body member 5, as the optical pickup is kept close to the optical disc 2. Consequently, the signal recording area may be formed up to the outer rim of the optical disc 2, thereby increasing the recording capacity of the optical disc. Moreover, since the optical pickup can be kept close to the optical disc 2, the numerical aperture NA of the objective lens may be increased to reduce the beam spot of the laser beam condensed on the signal recording surface of the optical disc 2, with the result that the information signals recorded on the optical disc 2 may be increased in recording density. Additionally, since it is possible to increase the recording capacity as well as the recording density, the optical disc 2 in need of a preset value of the recording capacity may be reduced in size. Since the optical pickup may be positioned across the inner and outer rims of the cartridge body member 5 to scan the optical disc 2, it is possible to reduce the size of the cartridge body member 5 and hence also the disc drive device 50 employing this cartridge body member 5.

With the disc cartridge 1 of the present invention, the shutter member 15, opening/closing the aperture for an optical head 13, is mounted for movement along the planar lateral surface 8 of the cartridge body member 5, as shown in FIGS. 1 and 2. Thus, the shutter member 15 is able to move rectilinearly with the support piece 17 lying along the planar lateral surface 8, thus assuring stable movement of the shutter member.

Since the aperture for an optical head 13 is formed facing the planar lateral surface 8 of the cartridge body member 5, the portion of the lower cartridge half 4 carrying the cut-out 25 may also present a rectilinear surface. Thus, even though the cut-out 25 is formed and the lateral surface 8 facing the outside of the cartridge body member 5 is opened, the aperture for an optical head 13 in its entirety may positively be closed by the shutter member 15, which is rectangular in profile and which is provided with the rectilinear support piece 17 having a U-shaped cross-section.

The method for forming a buffering part of the shutter member 15 in the disc cartridge 1 according to the present invention is now explained. In the following explanation, the parts or components which are the same as those of the disc cartridge 1 are depicted by the same reference numerals and the corresponding explanation is omitted for simplicity.

Figure 9:
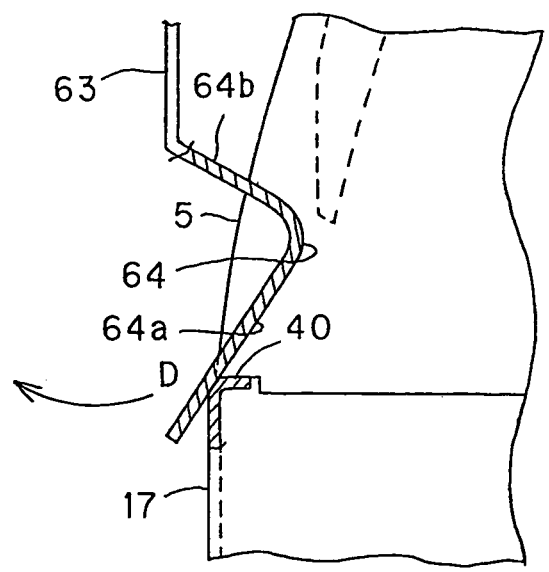
FIG. 9 is a plan view showing another example of the shutter member of the disc cartridge embodying the present invention.

A buffering part 40 is formed at the downstream side end along the movement direction of the shutter member 15 adapted for opening/closing the aperture for an optical head 13 of the cartridge body member 5. The buffering part 40 is tapered by chamfering the end at an outer lateral side corner of the support piece 17, as shown in FIG. 9. Hence, when the disc cartridge 1 is introduced into the disc drive device 50, the shutter opening/closing member 63, provided to the disc drive device, may smoothly ride on the support piece 17, by being abutted against and guided along the tapered buffering part 40. Consequently, the disc cartridge 1 may be inserted with a smooth sense of insertion into the disc drive device 50, with there being no catch due to collision between the end of the support piece 17 of the shutter member 15 and the shutter opening/closing member 63 of the disc drive device 50. In addition, deterioration or wear of colliding parts or generation of dust and dirt may be prohibited by buffering the collision between the shutter member 15 and the shutter opening/closing member 63.

The torsion coil spring 29 is now explained. This torsion coil spring 29 causes movement of the shutter member 15 in a direction of opening/closing the aperture for an optical head 13, while holding the shutter member 15 in the position of opening or closing the aperture for an optical head 13. The torsion coil spring 29 has its one end retained by the shutter member 15, while having its other end rotationally engaged with the cartridge body member 5. The torsion coil spring 29 rotationally biases the shutter member 15 in the direction of opening or closing the aperture for an optical head 13 depending on the position of movement of the shutter member 15 relative to the cartridge body member 5.

Figure 10A:
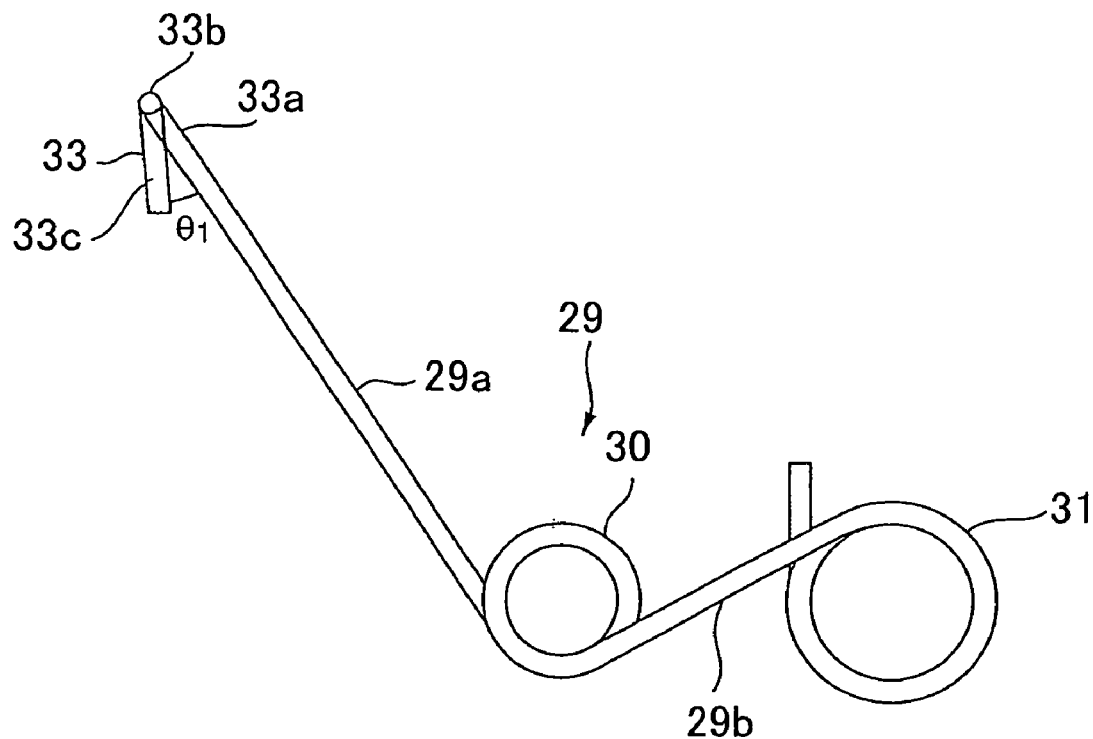
FIG. 10A is a plan view showing a torsion coil spring biasing the shutter member and FIG. 10B is a front view thereof.
Figure 10B:
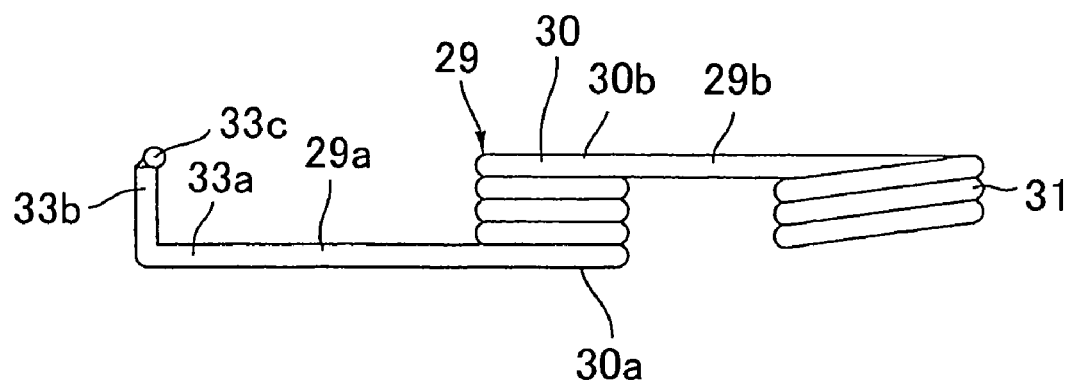

Referring to FIGS. 10A and 10B, the torsion coil spring 29 is made up by a first arm 29a and a second arm 29b on both sides of a first coil 30 at a mid part thereof. The first and second arms 29a, 29b are retained by the shutter member 15 and are carried by a portion of the cartridge body member 5, respectively.

The first coil 30 is formed to a preset thickness, by being wound several turns, with the first arm 29a and the second arm 29b extending from one end 30a and the opposite end 30b along the direction of thickness thereof, respectively. While the wire diameter, number of turns or the free extending angle of the first coil 30 may be designed freely, such a torsion coil spring having optimum values of these parameter is most preferred.

The first arm 29a, extended from the first coil 30, is provided at the distal end thereof with a retainer 33 adapted to be retained by the shutter member 15. The retainer 33 is made up by an extension 33a, extended from the distal end of the first arm 29a, a riser 33b bent at substantially a right angle to the extending direction of the extension 33a, along the winding direction of the first coil 30, and a bend 33c extending from the distal end of the riser 33b approximately parallel to the first arm 29a. The retainer is formed in its entirety substantially to a U-shape. The bend 33c of the retainer 33 makes a preset angle θ1 with respect to the direction of extension of the first arm 29a. This retainer 33 has its riser 33b introduced into the retention opening 27 bored in the distal end part of the coil spring mounting piece 26 of the shutter member 15, via an open end thereof, and is retained thereby to get the torsion coil spring 29 carried by the shutter member 15.

Figure 11:
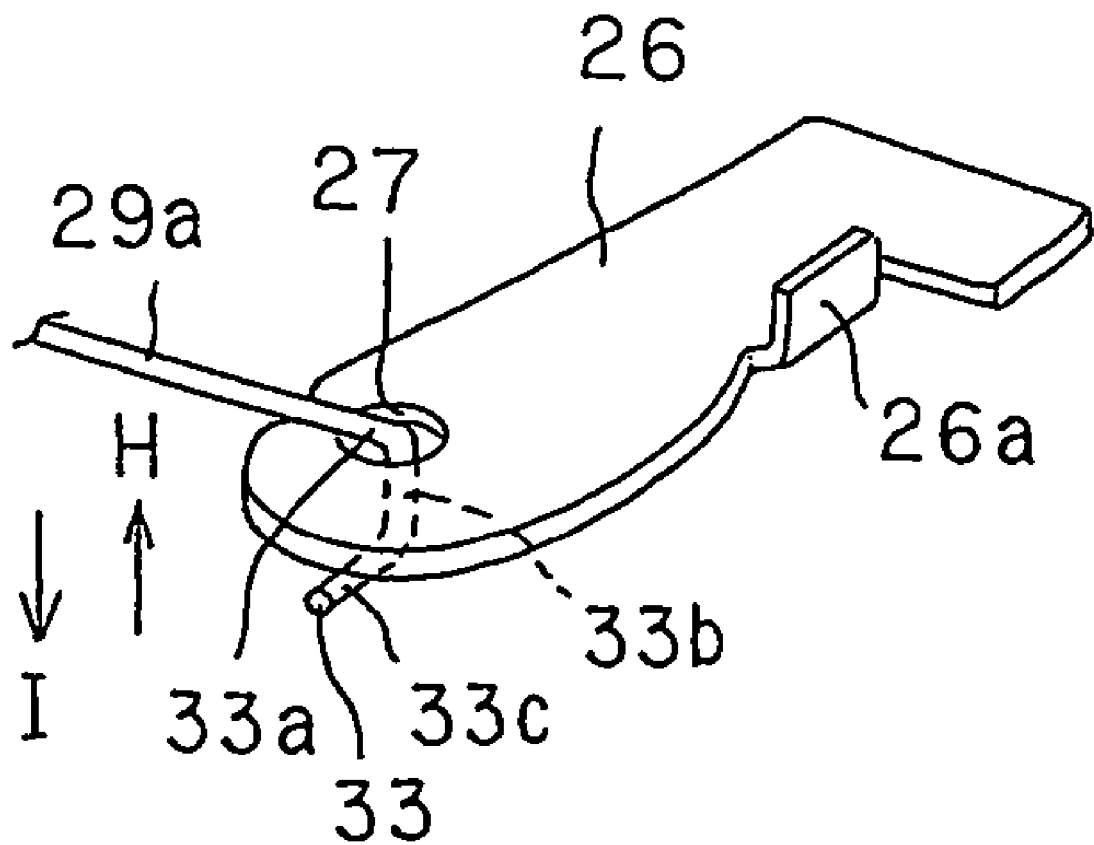
FIG. 11 is a perspective view showing the torsion coil spring retained by the shutter member.

Since the bend 33c of the retainer 33 makes an angle of θ1 with the direction of extension of the first arm 29a, the retainer 33 may be prohibited from being disengaged from the retention opening 27 of the retainer 33 even when the shutter member 15 has made opening/closure movement. That is, the torsion coil spring 29, the retainer 33 of which is bent at the distal end thereof, has the bend 33c extending along the lower surface of the coil spring mounting piece 26, as shown in FIG. 11. Hence, even when the torsion coil spring 29 is swung along the direction indicated by arrow H in FIG. 11, or when the shutter member 15 is swung in the direction of arrow H in FIG. 11, during the opening/closing movement of the shutter member 15, the bend 33c of the retainer 33 is abutted against the lower surface of the coil spring mounting piece 26 to prevent the torsion coil spring 29 and the shutter member 15 from becoming disengaged from each other.

The second arm 29b of the torsion coil spring 29 includes a second coil 31c for having the torsion coil spring 29 rotationally engaged with the cartridge body member 5, as shown in FIG. 10. This second coil 31 is wound a plural number of times in the opposite winding direction to that of the first coil 30 in a direction towards the one end 30a along the direction of thickness of the first coil 30. The second coil 31 is rotationally mounted to a support pin 42 protuberantly formed on the inner surface of the cartridge body member 5. While the wire diameter, number of turns or the free extending angle of the second coil 31 may be designed freely, as in the case of the first coil 30, such a torsion coil spring having optimum values of these parameter is desirably used.

Since the first coil 30 and the second coil 31 of the torsion coil spring 29 are wound a plural number of times in opposite directions to each other, the thickness of the entire torsion coil spring 29 may be suppressed to reduce the size of the cartridge body member 5. That is, if, in a torsion coil spring having plural coils, the winding directions of the respective coils are the same, the second coil 31 is wound from the position of the opposite end 30b of the first coil 30 in the same direction as the first coil, that is, towards the opposite end 30b along the direction of thickness of the first coil 30. Thus, the thickness of the first coil 30 adds up to that of the second coil 31c, resulting in the increased overall thickness of the spring and hence the increased thickness of the cartridge body unit in which to accommodate the torsion coil spring. The thickness of the disc drive device 50, for which the disc cartridge is inserted/detached, is also increased.

With the torsion coil spring 29, in which the first coil 30 and the second coil 31c are opposite in the winding directions thereof, the second coil 31 is wound towards the one end 30a of the first coil 30 and hence the overall spring thickness can be suppressed to the thickness of the first coil 30 or to that of the second coil 31.

Figure 12:
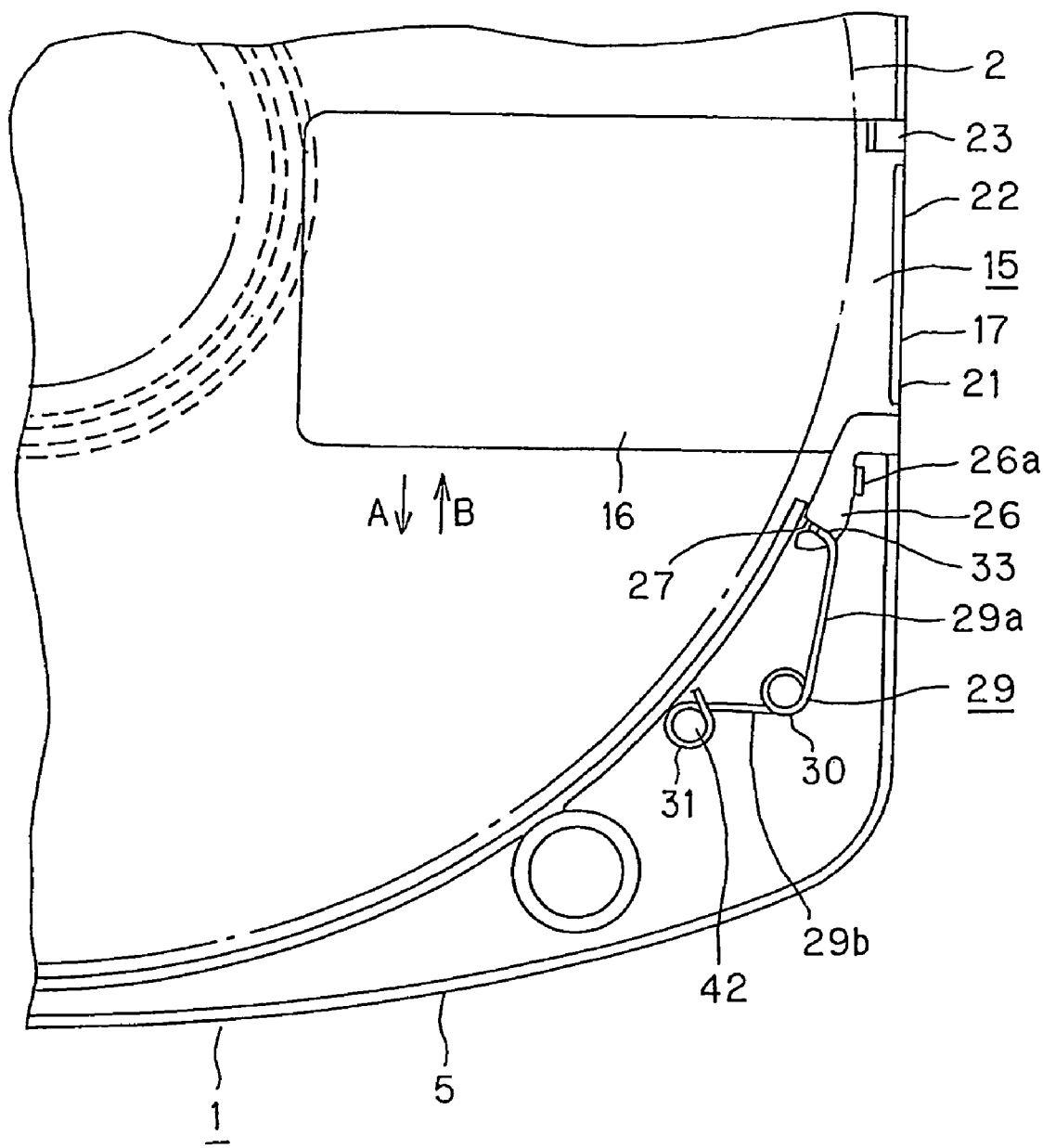
FIG. 12 is a plan view showing the disc cartridge with the aperture for a head being closed by the shutter member.

Referring to FIG. 12, the torsion coil spring 29 is provided towards the side of destination of movement of the shutter member 15 in the direction of opening the aperture for an optical head 13. That is, the torsion coil spring 29 is provided towards the upstream side of movement of the shutter member 15 from the position of closing the aperture for an optical head 13 to the position of opening the aperture.

Meanwhile, the upstream side of movement of the shutter member 15 is the direction of movement of the shutter member more and more away from the aperture for an optical head 13. Thus, by providing the torsion coil spring 29 on this upstream side, the torsion coil spring 29 may be prevented from being protruded into the aperture for an optical head 13 when the aperture for an optical head 13 is opened, and hence the aperture for an optical head 13 may be opened wide apart.

In addition, in the disc cartridge 1 of the present embodiment, the upstream side of the movement of the shutter member 15 is the rear side corner thereof opposite to the end of insertion thereof into the disc drive device 50, and hence may be designed as a space with sufficient allowance, thus enabling the torsion coil spring 29 to be arranged efficaciously in the cartridge body member 5.

When in the position of closing the aperture for an optical head 13, the shutter member 15 is biased by the torsion coil spring 29 along the direction indicated by arrow B in FIG. 12 to keep the aperture for an optical head 13 closed. When the disc cartridge 1 is inserted into the disc drive device 50 and loaded by the cartridge holder, the shutter opening/closing member 63, provided to the disc drive device 50 and protruded into the transport passageway for the shutter member 15, is intruded into the guide groove 14, formed in the lateral surface 8 of the cartridge body member 5, so as to be abutted against the support piece 17 of the shutter member 15 from the downstream side along the direction of movement of the shutter member 15. When the shutter opening/closing member 63 collides against the buffering part 20, formed on the support piece 17 of the shutter member 15, the shutter opening/closing member 63 may smoothly ride on the support piece 17 so as to be slid thereon, as the shutter opening/closing member 63 is flexed towards outside of the cartridge body member 5, as it is guided by the smoothly bent buffering part 20.

Since the buffering part 20 is smoothly curved, the shock due to collision between the shutter opening/closing member 63 and the shutter member 15 may be absorbed and hence there is no catch by the end of the support piece 17 of the shutter member 15 to improve the sense of insertion of the disc cartridge into the disc drive device. In addition, deterioration or wear of colliding parts or generation of dust and dirt, otherwise caused by collision of the shutter opening/closing member 63 and the shutter member 15, may be prohibited from occurrence.

The shutter opening/closing member 63, slid along the support piece 17, is intruded into the engagement opening 17a, formed at a mid part of the support piece 17, so as to be engaged with the shutter member 15. The shutter member 15 is also abutted by a shutter opening operating member, not shown, such that its movement relative to the cartridge body member 5 transported into the inside of the main body unit of the apparatus is regulated by the shutter opening/closing member 63 and by the shutter opening operating member. Hence, the shutter member is moved relative to the cartridge body unit, in the direction indicated by arrow A in FIG. 1, to open the aperture for an optical head 13.

When the shutter member 15 is moved relative to the cartridge body member 5 in the direction indicated by arrow A in FIG. 1, the position of the first coil 30 of the torsion coil spring 29, formed at a non-stationary center, is moved along the direction of arrow A along the direction of movement of the shutter member 15, with the support pin 42, about which is rotationally engaged the second coil 31, as the center of rotation. When the first coil 30 is further moved in the direction of arrow A until it has moved beyond the position of the support pin 42, the biasing direction of the torsion coil spring 29 is inverted. When inverted in the biasing direction, the torsion coil spring 29 biases the shutter member 15 for movement along the direction of arrow A in FIG. 13 to cause movement of the shutter member 15 in the direction of arrow A in FIG. 13 for opening the aperture for an optical head 13 to maintain the shutter member 15 in the position of opening the aperture for an optical head 13.

When the disc cartridge 1, held in the position in which the shutter member 15 has opened the aperture for an optical head 13, is taken to outside the disc drive device 50, by way of performing the disc cartridge ejection operation, the cartridge body member 5 is transported to outside the disc drive device 50. The shutter member 15, the movement of which relative to the cartridge body member 5 is regulated by engagement by the shutter opening/closing member 63, is moved relative to the cartridge body member 5, along the direction indicated by arrow B in FIG. 13, by an operation which is the reverse of the operation of insertion already described.

Figure 13:
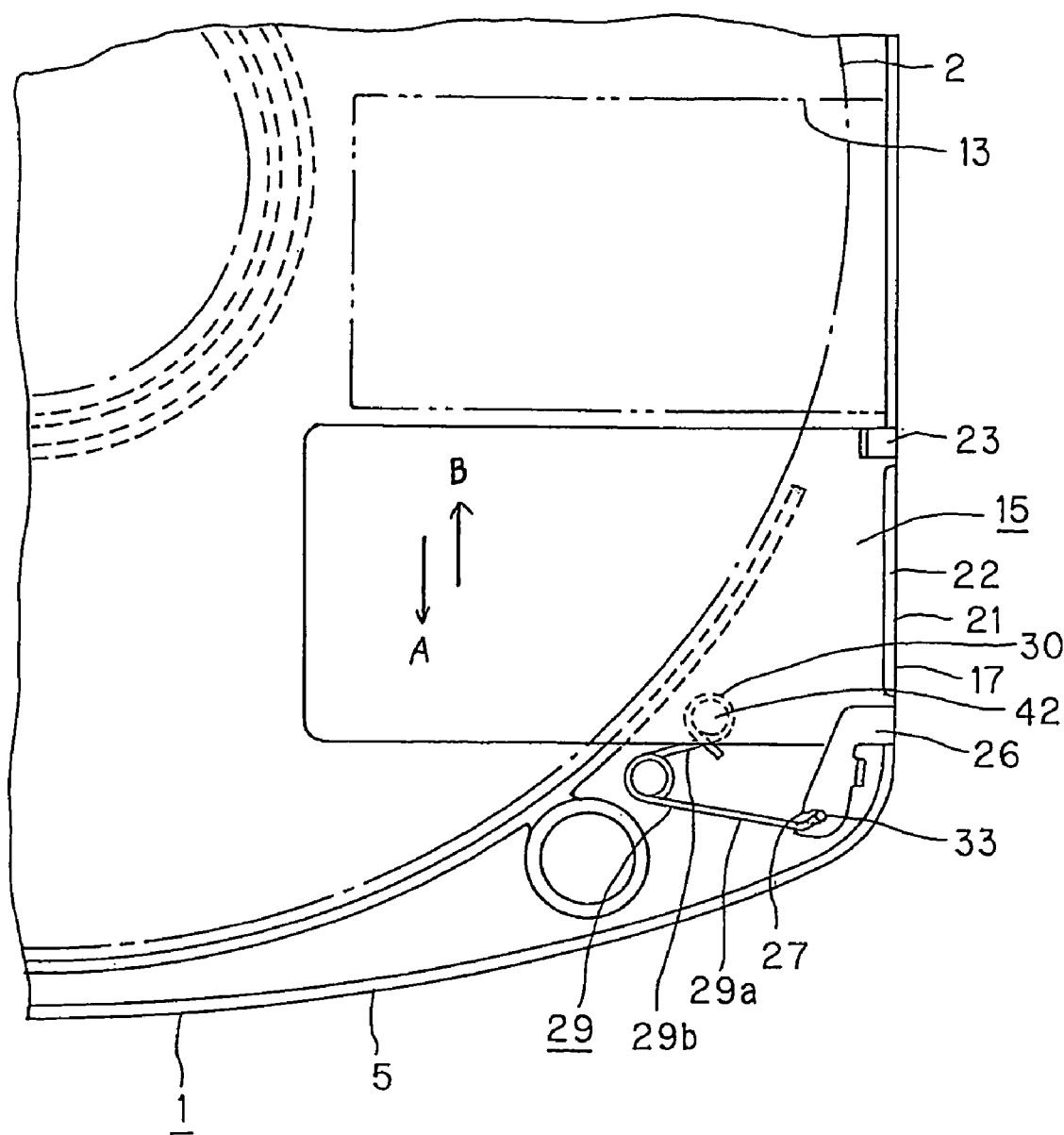
FIG. 13 is a plan view showing the disc cartridge with the aperture for a head being opened by the shutter member.

When the shutter member 15 is moved along the direction indicated by arrow B in FIG. 13, the first coil 30 at the mid part of the torsion coil spring 29 is also moved along the same direction as indicated by arrow B in FIG. 13. When the shutter member 15 is moved further along the direction indicated by arrow B, and the first coil 30 has traveled beyond the position of the support pin 42, lying along the direction of movement of the shutter member 15, the biasing direction is reversed. When the biasing direction is reversed, the torsion coil spring 29 biases the shutter member 15 along the direction indicated by arrow B in FIG. 12 to maintain the aperture for an optical head 13 in the closed position.

The shutter member 15, thus biased by the torsion coil spring 29, is supported in each of the position closing the aperture for an optical head 13 and the position opening the aperture for an optical head 13, under the bias of the torsion coil spring 29, for positively maintaining the state of closing or opening the aperture for an optical head 13.

On the other hand, since there is no necessity of providing the mechanism for holding the shutter member 15 at the position of opening the aperture for an optical head 13, against the bias of the biasing member, it is possible to simplify the mechanism of the disc drive device 50 and to reduce the size of the apparatus.

Moreover, with the disc cartridge 1, since the shutter member 15 is moved by the torsion coil spring 29 in the direction of opening or closing the aperture for an optical head 13, depending on the position of the shutter member 15 relative to the aperture for an optical head 13 provided to the cartridge body member 5, the aperture for an optical head may reliably be opened or closed in association with insertion or ejection of the disc cartridge for the disc drive device 50.

In addition, with the present disc cartridge 1, since the shutter member 15 is biased by the torsion coil spring 29 into movement towards the side of opening the aperture for an optical head 13, there is no necessity of providing an overstroke for causing movement of opening the aperture for an optical head 13, with the result that only a small area for movement for the shutter member 15 is sufficient, so that the disc cartridge 1 itself may be reduced in size.

It is noted that, on both sides of the back surface of the disc cartridge 1, formed as the curved section 10, there are formed, in the lower surface of the cartridge body member 5, first and second positioning holes 43, 44, engaged by positioning pins provided to the disc drive device 50, as shown in FIGS. 2 and 3. The second positioning hole 44 is formed as an oblong hole, having the width-wise direction perpendicular to the movement direction of the shutter member 15 as a long diameter, for adjusting the engagement position of the positioning pin.

In opposite lateral sides 8, 9 of the arcuate section 7 of the cartridge body member 5, there are formed engagement recesses 45, 46 engaged by parts of a cartridge loading mechanism provided to the disc drive device 50, on which is loaded the disc cartridge 1, as shown in FIGS. 1 and 2.

In addition, there is formed, in the opposite lateral side 9 of the arcuate section 7 of the cartridge body member 5, there is formed an engagement recess 47 for ejection, engaged by a part of an ejection mechanism provided to the disc drive device 50, as shown in FIG. 2.

In the lateral sides 8, 9 or in the bottom surface of the cartridge body member 5, there are formed discrimination holes or recesses for discriminating the sort of the optical disc, housed in the cartridge body unit, as necessary.

With the disc cartridge 1, constructed as described above, the upper and lower cartridge halves 3, 4 are formed by e.g. injection molding of e.g. polycarbonate, and the optical disc 2 as well as the torsion coil spring 29, is housed in position. The upper and lower cartridge halves 3, 4 are then abutted and connected to each other and the shutter member 15 is then mounted in position.

Figure 14:
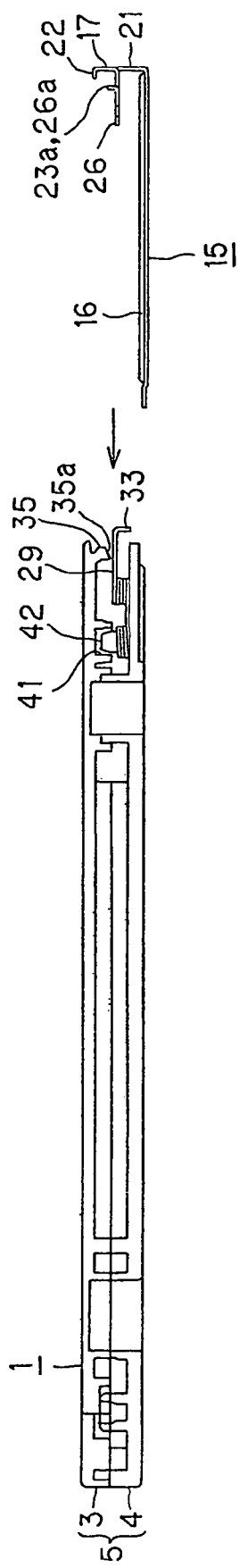
FIG. 14 shows the manner of mounting the shutter member to the cartridge body unit.

Specifically, the lower cartridge half 4 is secured to a jig, not shown, and the support pin 42, mounted upright on the lower cartridge half 4, is rotationally introduced into the second coil 31 of the torsion coil spring 29. The upper cartridge half 3 is abutted against and ultrasonically welded to the lower cartridge half 4, whereby the support pin 42 is carried by a bearing part 41 provided to the upper cartridge half 3 and the torsion coil spring 29 is rotatably housed within the cartridge body member 5. At this time, the second coil 31 of the torsion coil spring 29 is rotatably carried by the support pin 42, so that the retainer 33 may now be protruded outwards via the lateral side 8 of the cartridge body member 5 formed with the slide guide part 18, as shown in FIG. 14.

The shutter member 15 is formed by punching and bending a thin metal sheet, or on molding a synthetic resin material, as described above. This shutter member 15 is mounted to the slide guide part 18, formed in the lateral side 8 of the cartridge body member 5, after the retainer 33 of the torsion coil spring 29, protruded from the lateral side 8 of the cartridge body member 5, is mounted in position to the coil spring mounting piece 26.

Specifically, the shutter part 16 of the shutter member 15 is extended along the shutter slide part 19, provided to the lower cartridge half 4, as the second engagement part 23 and the coil spring mounting piece 26, provided to the connecting part 21, are extended along a tapered surface 35a of a guide rail 35 provided to the upper cartridge half 3. The shutter member 15 is connected to the torsion coil spring 29 by the riser 33b of the retainer 33 of the torsion coil spring 29 being inserted via an open end of the retention opening 27 of the coil spring mounting piece 26 extended from the connecting part 21. The shutter member 15 is then slidably mounted to the cartridge body member 5, to complete the assembling of the disc cartridge 1, by engaging the first engagement part 22, extended from the connecting part 21 in the engagement groove 24 of the upper cartridge half 3 by the own resiliency, and by positioning the bent part 23a of the second engagement part 23 and the bent part 26a of the coil spring mounting piece 26 on the inner side of the guide rail 35, as shown in FIG. 8

The shutter member 15 may be mounted readily to the cartridge body member 5 by providing the retainer 33 of the torsion coil spring 29 with the riser 33b and by introducing the riser 33b into the retention opening 27, opened at one end, of the coil spring mounting piece 26, to provide for engagement between the torsion coil spring 29 and the shutter member 15. After the engagement is established, the extension 33a or the bend 33c provided to the retainer 33 of the torsion coil spring 29 is abutted against the coil spring mounting piece 26 to prohibit the torsion coil spring 29 and the shutter member 15 from becoming disengaged readily from each other.

An example of a disc drive device for recording and/or reproducing information signals for the optical disc 2, housed in the disc cartridge 1, described above, is now explained.

Figure 15:
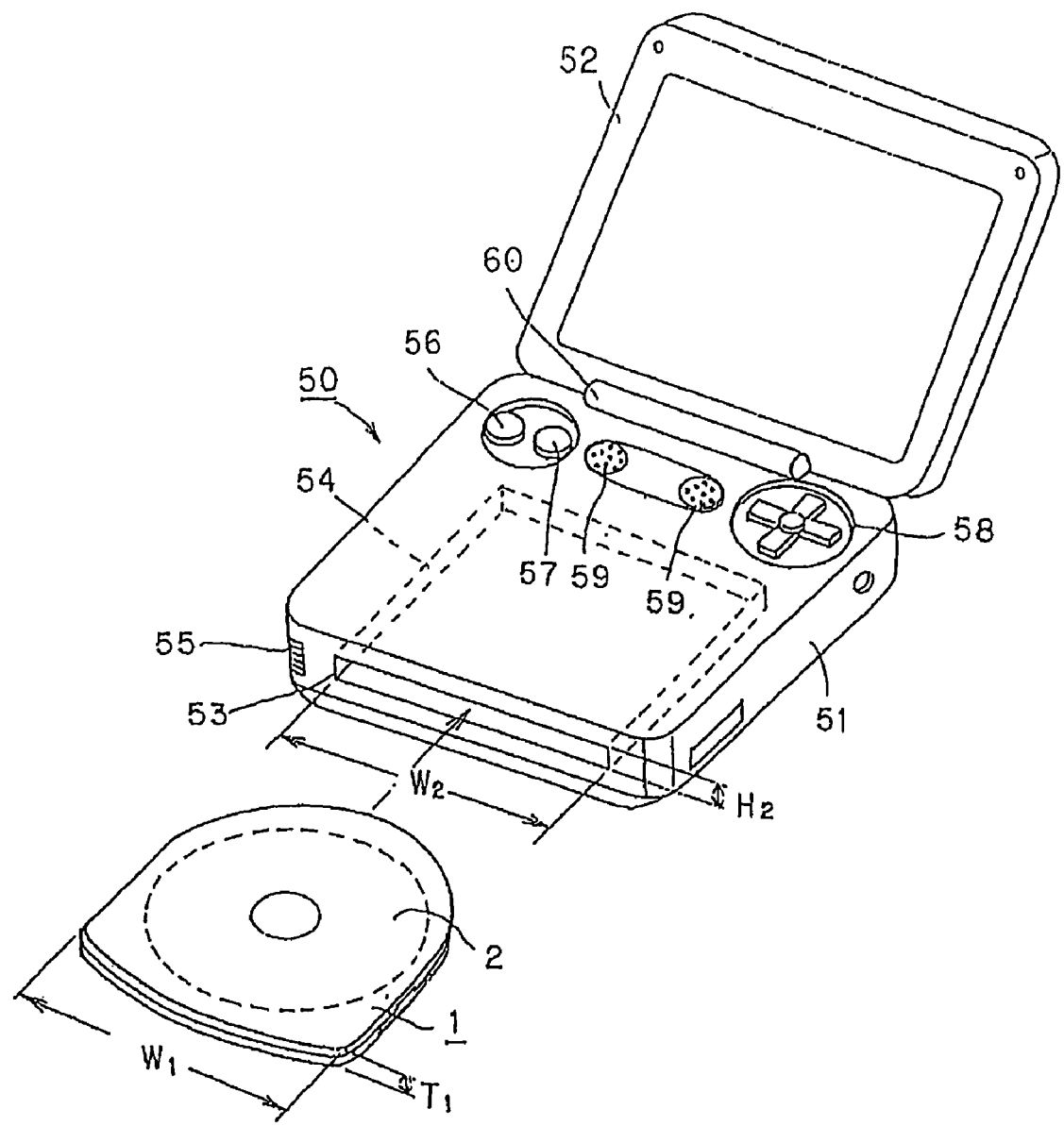
FIG. 15 is a perspective view showing an example of a disc drive device employing a disc cartridge according to the present invention.

The disc cartridge 1 according to the present invention houses therein an optical disc 2 having recorded thereon program data or video data for running e.g. a television game. Thus, as a disc drive device, employing the disc cartridge 1, having housed therein the optical disc 2 according to the present invention, a disc drive device 50 including a disc drive device 51 and a display unit 52, as shown in FIG. 15, is used. The disc drive device 51 is loaded with the disc cartridge 1 and has enclosed therein a disc drive unit for reproducing at least data recorded on the optical disc 2, and the display unit 52 is adapted for demonstrating picture data or letter/character data reproduced from the optical disc 2.

In the disc drive device 51 of the disc drive device 50, having enclosed therein the disc drive unit, shown in FIG. 15, there is provided a cartridge loading mechanism including a cartridge holder for loading the disc cartridge to the disc drive unit, although the cartridge loading mechanism is not shown. In the front surface of the disc drive device 51, forming its one lateral side, there is formed a cartridge insertion/ejection opening 53 for introducing the disc cartridge 1 into the cartridge holder and for ejecting the disc cartridge 1 loaded on the cartridge holder. The cartridge insertion/ejection opening 53 is formed as an opening just large enough to permit insertion/ejection of the disc cartridge 1, and has a width W2 slightly larger than the width W1 of the disc cartridge 1 and a height H2 only slightly larger than the width W1 of the disc cartridge 1 introduced therein. The cartridge holder 54 is arranged facing the cartridge insertion/ejection opening 53 in the main body unit of an apparatus 51.

Towards one side of the front surface of the main body unit of an apparatus 51, there is mounted an ejection button 55 for ejecting the disc cartridge 1 held in the cartridge holder 54.

Towards one side of the upper surface of the main body unit of an apparatus 51, there are provided operating buttons 56, 57 for actuating a control switch used in playing e.g. a television game. Towards the opposite side of the upper surface of the main body unit of an apparatus 51, there are provided a control key 58 for scrolling an image demonstrated on the display unit 52 and a loudspeaker 59 for outputting audio signals reproduced from the optical disc 2.

On the main body unit of an apparatus 51, there are mounted e.g. control buttons, such as playback buttons, or a power supply switch actuating button, for controlling the disc drive unit, although these buttons are not shown.

The display unit 52 is rotatably mounted, via a hinge unit 60, to the main body unit of an apparatus 51, on the back surface side of the main body unit of an apparatus 51, opposite to the front side surface provided with the cartridge inserting/ejecting opening 53. The display unit 52 may be rotated towards the main body unit of an apparatus 51 so as to be superposed on the upper surface thereof, and is formed using a liquid crystal display panel.

The state in which the disc cartridge 1 according to the present invention is loaded on the above-described disc drive device 50 is now explained.

In loading the disc cartridge 1 on the disc drive device 50, the disc cartridge 1 is inserted via cartridge insertion/ejection opening 53 into the main body unit of an apparatus 51, with the foremost side thereof carrying the arcuate section 7 as an inserting end, and is held by the cartridge holder 54, as shown in FIG. 15.

Meanwhile, since the inserting side of the disc cartridge of the present invention into the cartridge inserting/ejecting opening 53 is formed as the approximately semicircular arcuate section 7, the disc cartridge 1 may smoothly be introduced into the cartridge inserting/ejecting opening 53 and positively held by the cartridge holder 54, even in case a width-wise centerline P2 of the disc cartridge is appreciably tilted relative to a width-wise centerline P1 of the cartridge inserting/ejecting opening 53.

Figure 16:
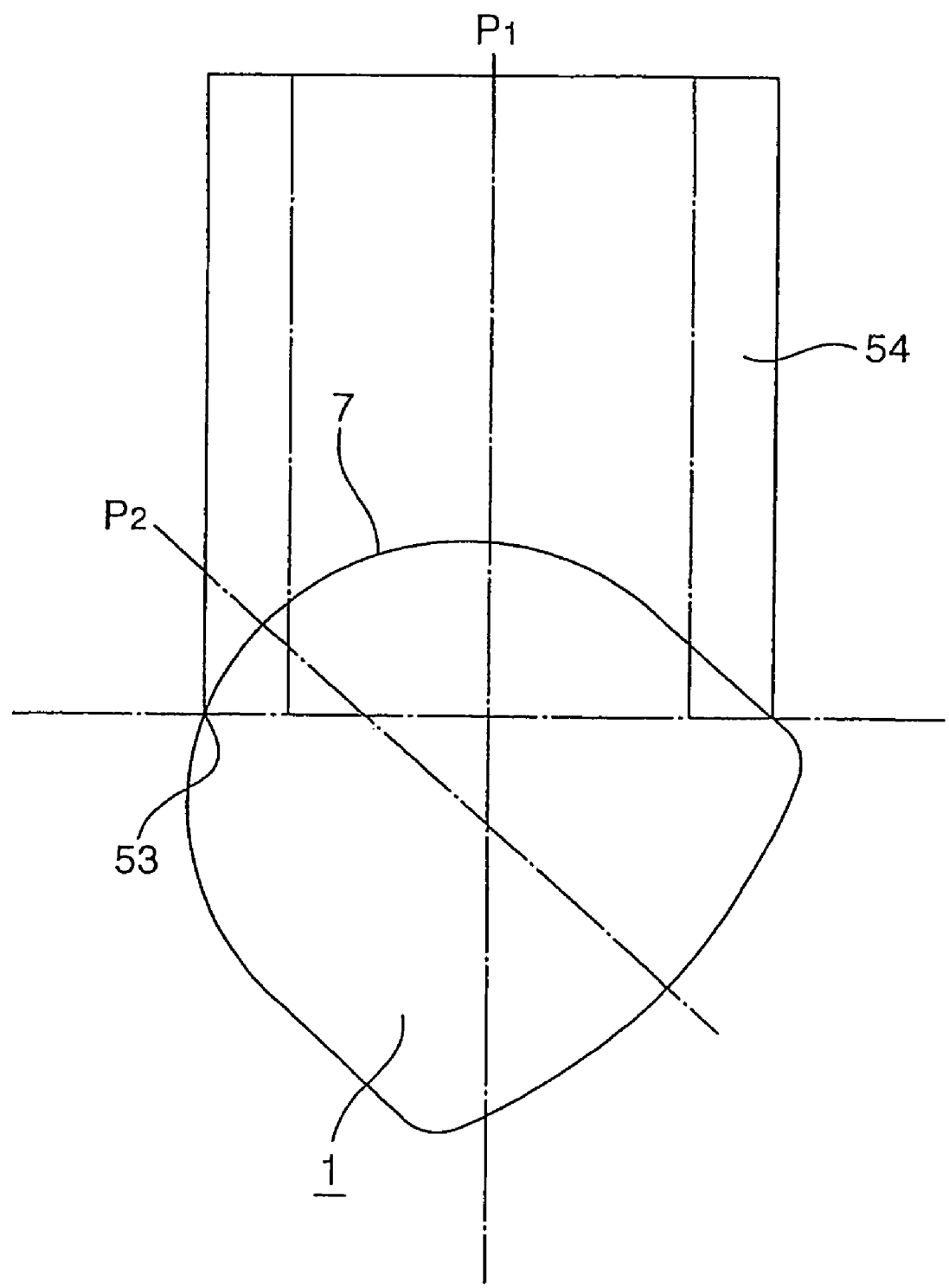
FIG. 16 is a plan view showing the state in which the disc cartridge is being introduced at an inclined state relative to the cartridge inserting/ejection opening of the disc drive device.
Figure 17:
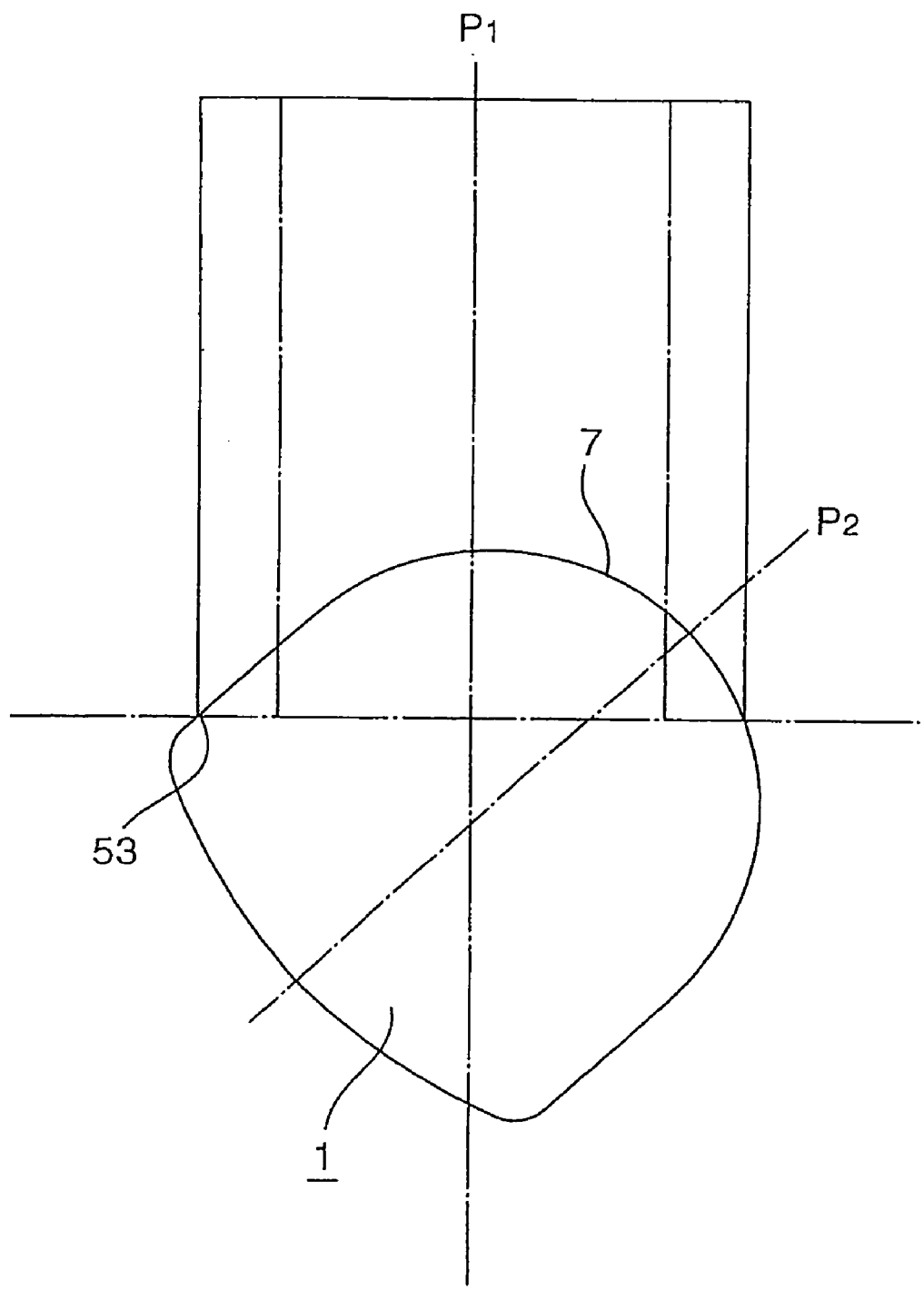
FIG. 17 is a plan view showing the state in which the disc cartridge is being introduced in an inclined state in another direction relative to the cartridge inserting/ejection opening of the disc drive device.
Figure 18:
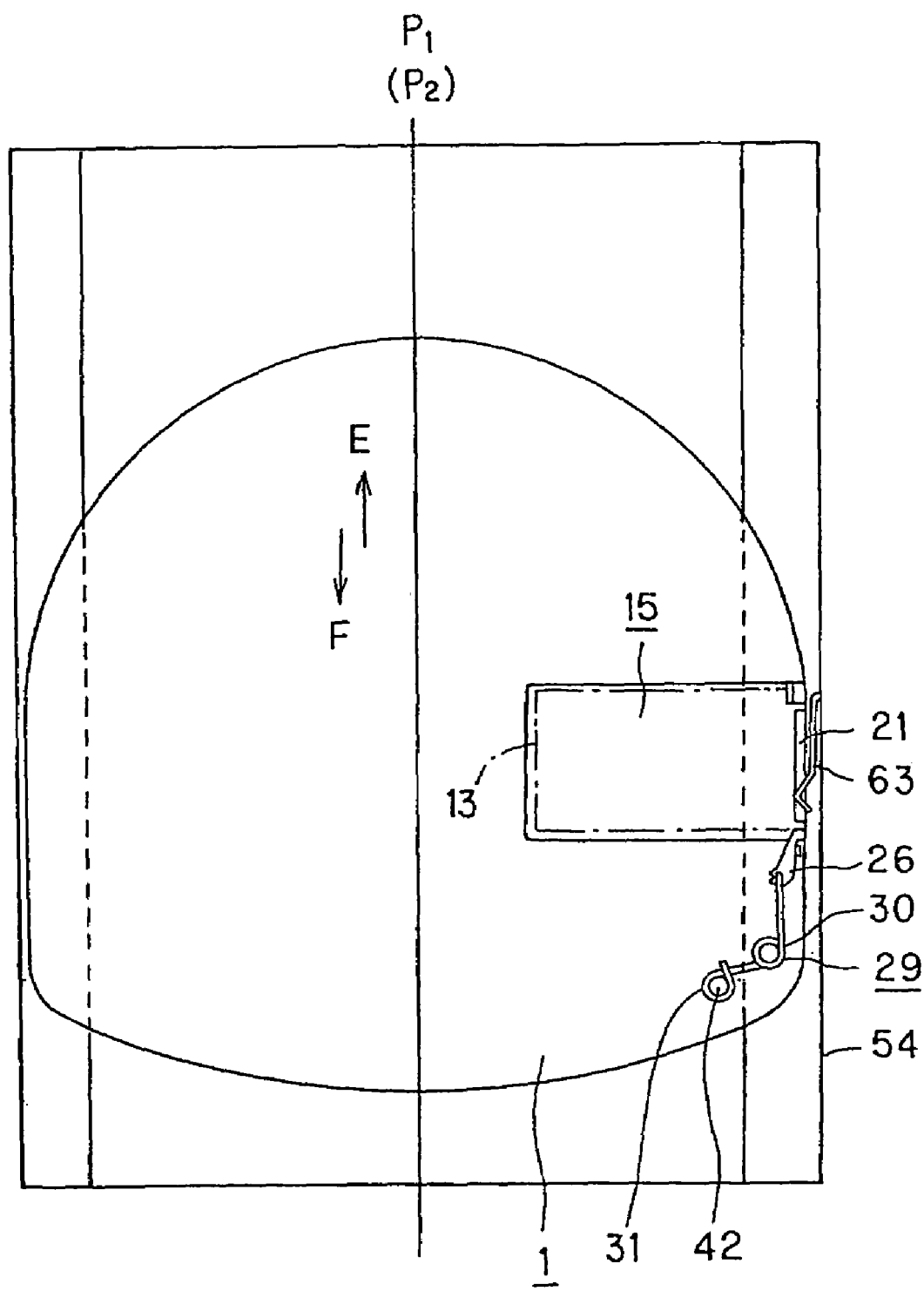
FIG. 18 is a plan view showing the state the disc cartridge has been introduced with a controlled orientation into a cartridge holder.

That is, the disc cartridge 1, having the inserting end formed as the substantially semicircular arcuate section 7, may be introduced into the main body unit of an apparatus 51 via the semicircular arcuate section 7, even in case the width-wise centerline P2 of the disc cartridge is inclined by up to approximately 45° towards left or right relative to the width-wise centerline P1 of the cartridge inserting/ejecting opening 53, as shown in FIGS. 16 and 17. In such case, in the course of insertion into the cartridge inserting/ejecting opening 53, the disc cartridge 1 is rotated, with the portion of the arcuate section 7 thereof, abutted against one or the other lateral side of the cartridge inserting/ejecting opening 53, as the center of rotation, so that the centerlines P1, P2 will be brought into coincidence with each other, as shown in FIG. 18, such as to readily correct the orientation of the disc cartridge. Thus, the disc cartridge 1 according to the present invention may positively be loaded in position on the cartridge holder 54 even in case of severe deviation of the direction of insertion thereof into the cartridge inserting/ejecting opening 53.

With the disc cartridge 1, inserted into the cartridge holder 54, the shutter opening/closing member 63, arranged in the cartridge holder 54, is introduced into the disc cartridge via guide groove 14 in its lateral side 8 into abutment against the shutter member 15. The shutter member is flexed along the direction indicated by arrow D in FIG. 5, by the inclined abutment surface 64a of the engagement part 64 abutting against the support piece 17 of the shutter member 15. The shutter opening/closing member 63 is engaged with the shutter member 15 by the engagement part 64 sliding along the support piece 17 so as to be intruded into the engagement opening 17a.

At this time, the shutter opening/closing member 63 may be abutted against the buffering part 20 and guided by the moderately bent or tapered buffering part 20 so as to ride smoothly on the support piece 17. Consequently, the disc cartridge 1 may be inserted with a smooth sense of insertion into the disc drive device, with there being no catch due to collision between the end of the support piece 17 of the shutter member 15 and the shutter opening/closing member 63 of the disc drive device 50. In addition, deterioration or wear of colliding parts or generation of dust and dirt may be prohibited by absorbing the shock of collision between the shutter member 15 and the shutter opening/closing member 63.

The shutter member 15 is abutted against a shutter opening member, not shown, and has its movement regulated by the shutter opening/closing member 63 and the shutter opening member, such that the shutter member 15 is moved relative to the cartridge body member 5, transported into the disc drive device 50, along the direction indicated by arrow A in FIG. 1, thereby opening the aperture for an optical head 13.

Figure 19:
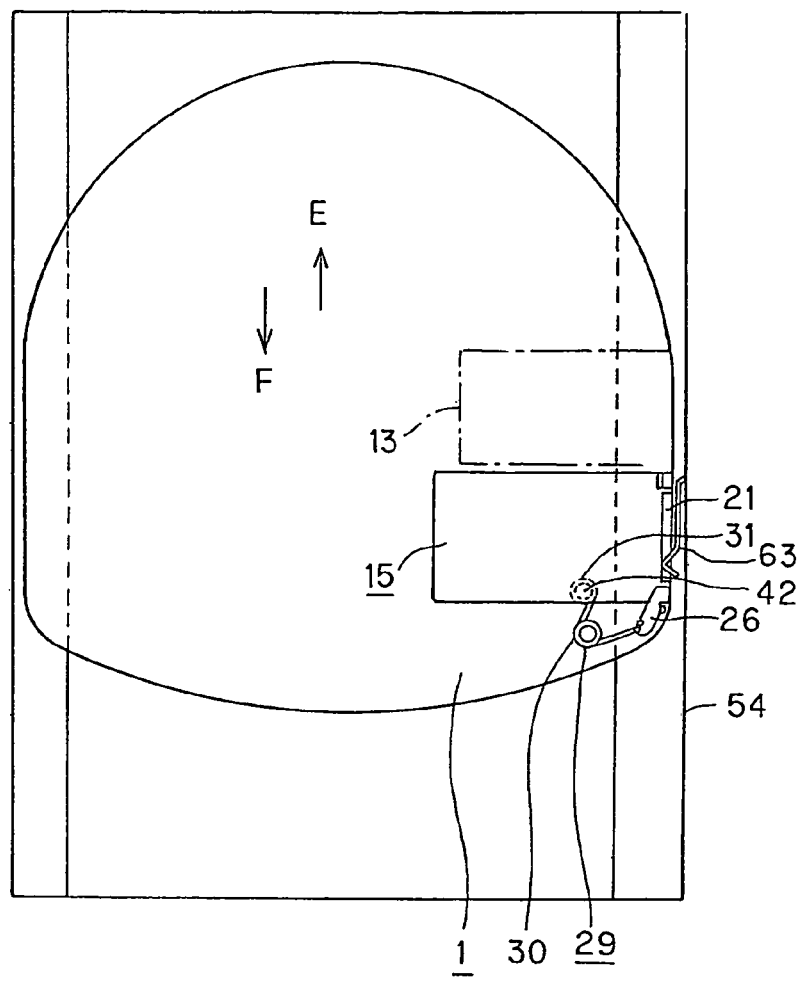
FIG. 19 is a plan view showing the state the disc cartridge has been inserted into the cartridge holder, the shutter member is moved and the aperture for a head has been opened.
Figure 20:
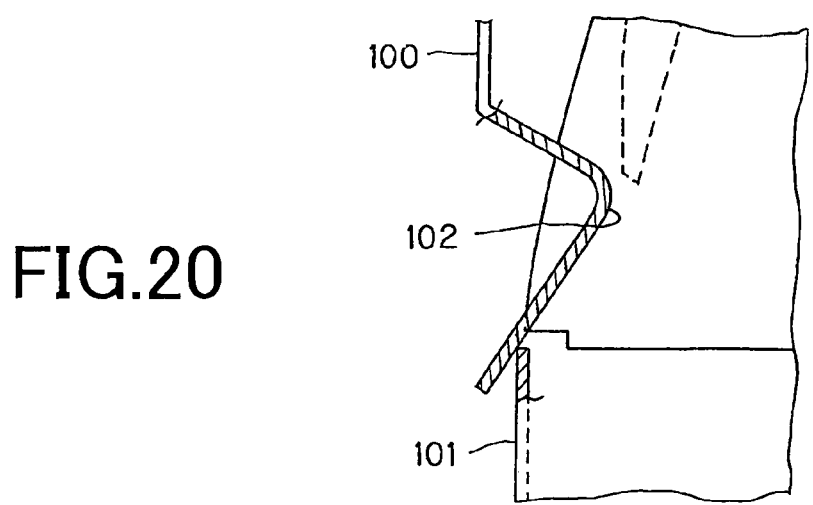
FIG. 20 is a plan view showing a shutter member of a conventional disc cartridge.

If, with the movement of the shutter member 15 regulated, as described above, the cartridge body member 5 of the disc cartridge 1 is moved along the direction indicated by arrow E in FIG. 18, in which the cartridge body member 5 opens the aperture for an optical head 13, the torsion coil spring 29 is biased, as shown in FIGS. 13 and 19. If the torsion coil spring 29 is biased such that the cartridge body member 5 is moved along the direction indicated by arrow E in FIG. 18 and the first coil 30 has traveled past the position of the support pin 42, located to a downstream side along the direction of movement of the shutter member 15, the biasing direction of the torsion coil spring 29 is reversed, such that the shutter member 15 is moved along the direction indicated by arrow F in FIG. 18, which is the reverse of the movement direction of the cartridge body member 5, thereby opening the aperture for an optical head 13, as shown in FIGS. 13 and 19. Since the shutter member 15 is biased by the torsion coil spring 29 in the direction of opening the aperture for an optical head 13, the aperture for an optical head may positively be maintained in the opened state.

The disc cartridge 1, inserted into the cartridge holder 54, as the aperture for an optical head 13 has been opened, is loaded in position on the cartridge loading unit provided in the disc drive device 50. At this time, the optical disc 2 is loaded in position on the disc drive device. The disc drive device is then actuated for reproducing program data recorded on the optical disc for running the program.

If, after reproducing the optical disc 2, the disc cartridge 1, loaded on the disc drive device 50, is ejected, an ejection button 55 is pressed. By actuating the ejection button 55, the operation for ejecting the disc cartridge 1, loaded on the cartridge loading unit, is carried out. When the ejecting operation is carried out, the disc cartridge 1 is transported towards the cartridge inserting/ejecting opening 53.

When the disc cartridge 1 has been transported towards the cartridge inserting/ejecting opening 53, the shutter member 15, the movement of which is regulated by the shutter opening/closing member 63, is slid along the direction indicated by arrow B in FIG. 1, relative to the cartridge body member 5, for closing the aperture for an optical head 13. The shutter member 15, slid along the direction indicated by arrow B in FIG. 1 relative to the cartridge body member 5, is biased along the direction indicated by arrow B by the torsion coil spring 29, having the biasing direction reversed, for maintaining the closed state of the aperture for an optical head 13.

When the shutter member 15 has its sliding regulated by abutment against the end of the slide unit part 19 towards the arcuate section 7, the inclined thrust surface 64b of the engagement part 64 of the shutter opening/closing member 63 is thrust by the end towards the arcuate section 7 of the engagement opening 17a, so that the shutter opening/closing member 63 is flexed along the direction indicated by arrow D in FIG. 5. The engagement part 64 is ejected from the engagement opening 17a, whereby the shutter opening/closing member 63 is disengaged from the shutter member 15.

After the operation of closing the aperture for an optical head 13 and disengaging the shutter opening/closing member 63 from the shutter member 15, the cartridge body member 5 is ejected from the cartridge inserting/ejecting opening 53 to complete the operation of ejecting the disc cartridge 1 loaded on the disc drive device 50.

The present invention has been explained with reference to a disc cartridge having a semicircular shaped inserting end for reducing the cartridge size. The present invention is, however, not limited to the above-described disc cartridge and may directly be applied to a disc cartridge having a rectangular profile or to a disc cartridge having a recording and/or reproducing aperture on each of the upper and lower sides of the cartridge body unit with advantages similar to those of the above-described disc cartridge.

In short, the present invention may be broadly applied to a disc cartridge having a shutter member adapted for opening/closing a recording and/or reproducing aperture provided to the cartridge body unit.

The present invention is not limited to the above embodiments explained with reference to the drawings and may encompass various changes, substitutions or equivalents without departing from the scope of the invention as defined in the claims.

The invention claimed is:

1. A disc cartridge comprising:
a disc;
a cartridge body unit having said disc rotatably housed therein and including a recording and/or reproducing aperture for exposing a part of said disc to outside; and
a shutter member slidably carried by said cartridge body unit, said shutter member including,
a shutter part configured to close said recording and/or reproducing aperture,
a support piece formed on the end of said shutter part,
an engagement portion configured to be engaged by a shutter opening/closing member of a recording and/or reproducing apparatus, and
a collision buffering part provided at the edge of said support piece and configured to abut against said shutter opening/closing member, said collision buffering part extending from the end part of said support piece along a curved line.

2. The disc cartridge according to claim 1 wherein said collision buffering part is a bend.

3. The disc cartridge according to claim 1 wherein said collision buffering part is a chamfered part.

4. The disc cartridge according to claim 1 wherein said collision buffering part is formed at a location struck by said shutter opening/closing member when the disc cartridge is loaded on said recording and/or reproducing apparatus.

5. The disc cartridge according to claim 1 wherein said collision buffering part is formed at a downstream side end along the sliding direction of said shutter member when the shutter member is slid in the direction of opening said recording and/or reproducing aperture.

6. The disc cartridge according to claim 5 wherein said engagement opening is formed on the more upstream side along the sliding direction of said shutter member than said collision buffering part.

7. The disc cartridge according to claim 1 wherein an inserting end of said cartridge body unit into said recording and/or reproducing apparatus is arcuate-shaped.

8. The disc cartridge according to claim 6 wherein, when the disc cartridge is loaded on said recording and/or reproducing apparatus, said shutter member begins sliding in the direction of opening said recording and/or reproducing aperture when said shutter opening/closing member collides against said collision buffering part so as to be then engaged with said engagement hole.

9. The disc cartridge according to claim 1, wherein said collision buffering part is for absorbing the shock of collision against said shutter opening/closing member of the recording and/or reproducing apparatus.

10. A disc cartridge comprising:
a disc;
a cartridge body unit having said disc rotatably housed therein and including a recording and/or reproducing aperture for exposing a part of said disc to outside; and
a shutter member slidably carried by said cartridge body unit, said shutter member including,
a shutter part configured to close said recording and/or reproducing aperture,
a support piece formed on the end of said shutter part,
an engagement portion configured to be engaged by a shutter opening/closing member of a recording and/or reproducing apparatus, and
means for buffering provided at the edge of said support piece, said means for buffering for abutting against said shutter opening/closing member, said means for buffering extending from the end part of said support piece along a curved line.

11. The disc cartridge according to claim 10 wherein said means for buffering includes a bent surface.

12. The disc cartridge according to claim 10 wherein said means for buffering includes a chamfered surface.

13. The disc cartridge according to claim 10 wherein said means for buffering is formed at a location struck by said shutter opening/closing member when the disc cartridge is loaded on said recording and/or reproducing apparatus.

14. The disc cartridge according to claim 10 wherein said collision buffering part is formed at a downstream side end along the sliding direction of said shutter member when the shutter member is slid in the direction of opening said recording and/or reproducing aperture.

15. The disc cartridge according to claim 14 wherein said engagement opening is formed on the more upstream side along the sliding direction of said shutter member than said means for buffering.

16. The disc cartridge according to claim 10 wherein an inserting end of said cartridge body unit into said recording and/or reproducing apparatus is arcuate-shaped.

17. The disc cartridge according to claim 15 wherein, when the disc cartridge is loaded on said recording and/or reproducing apparatus, said shutter member begins sliding in the direction of opening said recording and/or reproducing aperture when said shutter opening/closing member collides against said means for buffering so as to be then engaged with said engagement hole.

18. The disc cartridge according to claim 10, wherein said means for buffering is for absorbing the shock of collision against said shutter opening/closing member of the recording and/or reproducing apparatus.

19. A disc cartridge apparatus comprising:
a cartridge holder configured to hold a disc cartridge comprising a disc;
a cartridge body unit having said disc rotatably housed therein and including a recording and/or reproducing aperture for exposing a part of said disc to outside; and
a shutter member slidably carried by said cartridge body unit, said shutter member including,
a shutter part closing said recording and/or reproducing aperture,
a support piece formed on the end of said shutter part,
an engagement opening in a surface of the shutter member, and
a collision buffering part provided at the edge of said support piece, said collision buffering part extending from the end part of said support piece along a curved line; and
a shutter opening/closing member arranged in said cartridge holder,
wherein when said disc cartridge is loaded into said disc cartridge apparatus, said shutter opening/closing member begins sliding in the direction of opening said recording and/or reproducing aperture when said shutter opening/closing member abuts against said collision buffering part so as to be then engaged with said engagement opening.

* * * * *